United States Patent
Langoulant et al.

(10) Patent No.: US 10,068,203 B2
(45) Date of Patent: Sep. 4, 2018

(54) METHODS AND SYSTEMS FOR MANAGING TO DO ITEMS OR NOTES OR ELECTRONIC MESSAGES

(75) Inventors: Brendan Langoulant, San Francisco, CA (US); Stephen Lemay, San Francisco, CA (US); Scott Forstall, Mountain View, CA (US); David Paul Hearst, Redwood City, CA (US); Hernan Rodrigo Eguiluz, Sunnyvale, CA (US); Gregory Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1259 days.

(21) Appl. No.: 13/278,016

(22) Filed: Oct. 20, 2011

(65) Prior Publication Data

US 2012/0042028 A1 Feb. 16, 2012

Related U.S. Application Data

(60) Division of application No. 11/760,776, filed on Jun. 10, 2007, now Pat. No. 8,219,920, and a continuation-in-part of application No. 11/499,009, filed on Aug. 4, 2006, now Pat. No. 8,261,197.

(51) Int. Cl.
    G06F 17/30    (2006.01)
    G06Q 10/10    (2012.01)
(52) U.S. Cl.
    CPC ......... *G06Q 10/107* (2013.01); *G06Q 10/109* (2013.01)

(58) Field of Classification Search
    CPC ............. G06F 17/3028; G06F 17/2288; G06F 17/30309; G06Q 10/0631
    See application file for complete search history.

(56) References Cited

U.S. PATENT DOCUMENTS

| 5,301,270 A | 4/1994 | Steinberg et al. |
| 5,625,377 A | 4/1997 | Jenson |
| 5,787,448 A | 7/1998 | Anderson et al. |

(Continued)

OTHER PUBLICATIONS

Bellotti, Victoria et al. "Taking Email to Task: The Design and Evaluation of a Task Management Centered Email Tool," CHI 2003, Ft. Lauderdale, FL, Apr. 5-10, 2003, vol. 5, Issue 1, Paper: "Integrating Tools and Task," pp. 345-352.

(Continued)

*Primary Examiner* — Carol Choi

(74) *Attorney, Agent, or Firm* — Womble Bond Dickinson (US) LLP

(57) ABSTRACT

Methods and systems for managing To do items and/or notes and/or emails (or other electronic messages) are described. A record, such as a To do item, in a database maintained locally by the data processing system is encoded into metadata. The metadata is sent as a false email message by an email client application executing on the data processing system to a remote email message server. An email client application executing on a remote processing system accesses the email message server and receives the false email message containing the metadata. The remote client application then either converts the metadata back into a database record editable at the remote processing system or presents a non-editable view of the database record, for example as an incoming email message.

15 Claims, 38 Drawing Sheets

(56) References Cited

U.S. PATENT DOCUMENTS

| | | |
|---|---|---|
| 6,023,722 A | 2/2000 | Colyer |
| 6,026,410 A | 2/2000 | Allen et al. |
| 6,029,171 A | 2/2000 | Smiga et al. |
| 6,421,678 B2 | 7/2002 | Smiga et al. |
| 6,622,147 B1 | 9/2003 | Smiga et al. |
| 6,972,246 B2 | 12/2005 | Ruvolo et al. |
| 6,978,246 B1 | 12/2005 | Ruvolo et al. |
| 7,146,381 B1 | 12/2006 | Allen et al. |
| 7,333,976 B1 | 2/2008 | Auerbach et al. |
| 7,440,961 B1 | 10/2008 | Matousek |
| 7,449,958 B1 | 11/2008 | Ionescu |
| 7,499,958 B1 | 3/2009 | Ionescu |
| 7,802,206 B1 | 9/2010 | Davis et al. |
| 2002/0091697 A1 | 7/2002 | Huang et al. |
| 2002/0138582 A1* | 9/2002 | Chandra ............ G06Q 10/107 709/206 |
| 2003/0018651 A1 | 1/2003 | Funaki |
| 2003/0041179 A1 | 2/2003 | Snead et al. |
| 2003/0055829 A1 | 3/2003 | Kambo et al. |
| 2003/0097361 A1 | 5/2003 | Huang et al. |
| 2003/0135559 A1* | 7/2003 | Bellotti ................ G06Q 10/10 709/206 |
| 2003/0135659 A1 | 7/2003 | Bellotti et al. |
| 2004/0017400 A1 | 1/2004 | Ly et al. |
| 2004/0044646 A1 | 3/2004 | Hullot et al. |
| 2004/0158637 A1 | 8/2004 | Lee |
| 2004/0196313 A1 | 10/2004 | Wynn et al. |
| 2004/0243677 A1 | 12/2004 | Curbow et al. |
| 2004/0268246 A1* | 12/2004 | Leban ................ G06F 17/2247 715/239 |
| 2005/0050146 A1 | 3/2005 | Jani et al. |
| 2005/0071740 A1 | 3/2005 | Chee et al. |
| 2005/0015441 A1 | 6/2005 | Attwood et al. |
| 2005/0120108 A1 | 6/2005 | Wisniewski et al. |
| 2005/0192857 A1 | 9/2005 | Levine |
| 2005/0222891 A1 | 10/2005 | Chan et al. |
| 2005/0251826 A1 | 11/2005 | Orr |
| 2005/0289221 A1* | 12/2005 | Steele .................. H04L 12/585 709/206 |
| 2006/0020889 A1 | 1/2006 | Coppinger et al. |
| 2006/0095859 A1 | 5/2006 | Bocking et al. |
| 2006/0143613 A1 | 6/2006 | Lippe et al. |
| 2006/0190313 A1 | 8/2006 | Lu |
| 2006/0259924 A1* | 11/2006 | Boortz ............... H04N 5/44543 725/32 |
| 2006/0265396 A1 | 11/2006 | Raman et al. |
| 2007/0016646 A1 | 1/2007 | Tendjoukian et al. |
| 2007/0021137 A1 | 1/2007 | Kokkonen et al. |
| 2007/0038711 A1 | 2/2007 | MacBeth et al. |
| 2007/0130369 A1 | 6/2007 | Nayak |
| 2007/0150513 A1 | 6/2007 | Vanden Heuvel et al. |
| 2007/0186214 A1 | 8/2007 | Morgan |
| 2007/0239559 A1 | 10/2007 | Alperin et al. |
| 2007/0239831 A1 | 10/2007 | Basu |
| 2007/0239832 A1 | 10/2007 | Alperin et al. |
| 2007/0280459 A1 | 12/2007 | Yee et al. |
| 2008/0022379 A1 | 1/2008 | Wray |
| 2008/0033950 A1 | 2/2008 | Lemay et al. |
| 2008/0034315 A1 | 2/2008 | Langoulant et al. |
| 2008/0046311 A1 | 2/2008 | Shahine et al. |
| 2008/0098041 A1* | 4/2008 | Chidambaran ..... G06F 17/3056 707/999.201 |
| 2008/0104052 A1 | 5/2008 | Ryan et al. |
| 2008/0162614 A1 | 7/2008 | Hurmola et al. |
| 2008/0195455 A1 | 8/2008 | May et al. |
| 2008/0307007 A1 | 12/2008 | Alom et al. |

OTHER PUBLICATIONS

Cardoza, Patricia, "Special Edition Using Microsoft Office Outlook 2003," published Sep. 25, 2003, pp. 1-67.

Microsoft Outlook 2003, screenshot from working application, Figure 1.

Lawrence, "Drag and Drop for Time Management", Jul. 29, 2003, pp. 1-4.

Microsoft Outlook 2003 SP2; Screen Captures from MS Outlook 2003 SP2; Released Sep. 2005, pp. 1-7.

U.S. Appl. No. 60/597,500, titled "Email and Task Managing Software," 9 pages.

Copy2calendar, Nov. 26, 2007, 7 pages, http://www.loquisoft.com/copy2calendar_setup.exe.

Anagram, Quickstart, Nov. 26, 2007, 21 pages, http://getanagram.com/anagram/download.html.

Anagram, Setting Preferences, Nov. 16, 2007, 20 pages, http://getanagram.com/anagram/download.html.

Notice of Allowance and Fees for U.S. Appl. No. 11/760,776 dated Mar. 12, 2012, 8 Pages.

Final Office Action for U.S. Appl. No. 11/760,776 dated Sep. 20, 2011, 6 Pages.

Office Action for U.S. Appl. No. 11/760,776 dated Jun. 9, 2010, 17 Pages.

Office Action for U.S. Appl. No. 11/760,776 dated Mar. 29, 2011, 14 Pages.

Final Office Action for U.S. Appl. No. 11/760,776 dated Nov. 24, 2010, 17 Pages.

Office Action for U.S. Appl. No. 11/499,009 dated Oct. 15, 2008, 12 Pages.

Final Office Action for U.S. Appl. No. 11/499,009 dated Feb. 5, 2009, 28 Pages.

Office Action for U.S. Appl. No. 11/499,009 dated Jul. 15, 2009, 17 Pages.

Final Office Action for U.S. Appl. No. 11/499,009 dated Feb. 3, 2010, 18 Pages.

Office Action for U.S. Appl. No. 11/499,009 dated Nov. 14, 2011, 11 Pages.

Final Office Action for U.S. Appl. No. 11/499,009 dated Apr. 26, 2012, 5 Pages.

Notice of Allowance and Fees for U.S. Appl. No. 11/499,009 dated May 11, 2012, 7 Pages.

Notice of Allowance and Fees for U.S. Appl. No. 11/975,162 dated Apr. 27, 2011, 8 Pages.

Notice of Allowance and Fees for U.S. Appl. No. 11/975,162 dated Aug. 11, 2011, 8 Pages, Office Action for U.S. Appl. No. 11/975,162 dated Nov. 9, 2010, 34 Pages.

Final Office Action for U.S. Appl. No. 11/975,162 dated Jun. 24, 2010, 34 Pages.

Office Action for U.S. Appl. No. 11/975,162 dated Mar. 5, 2010, 29 Pages.

\* cited by examiner

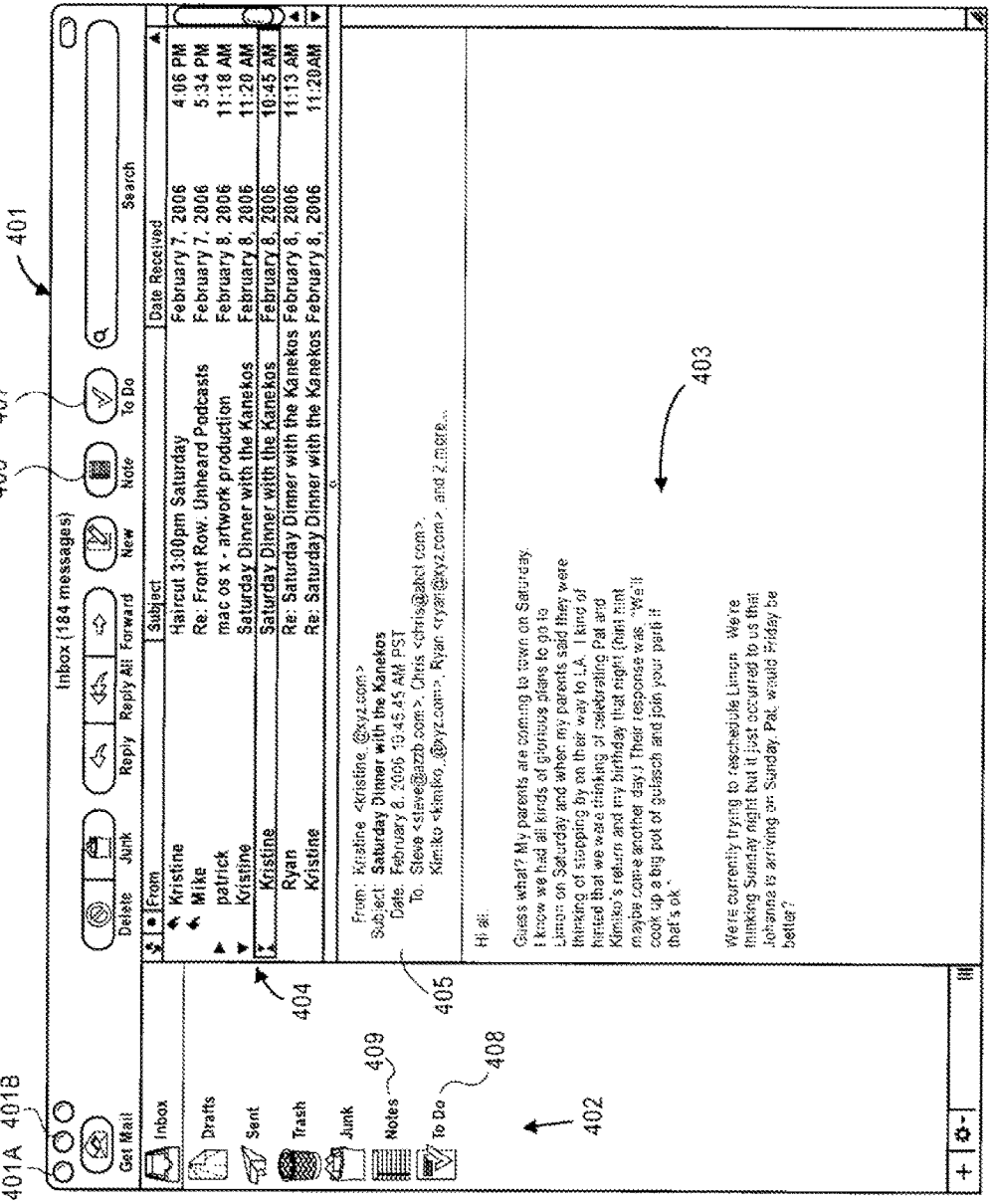

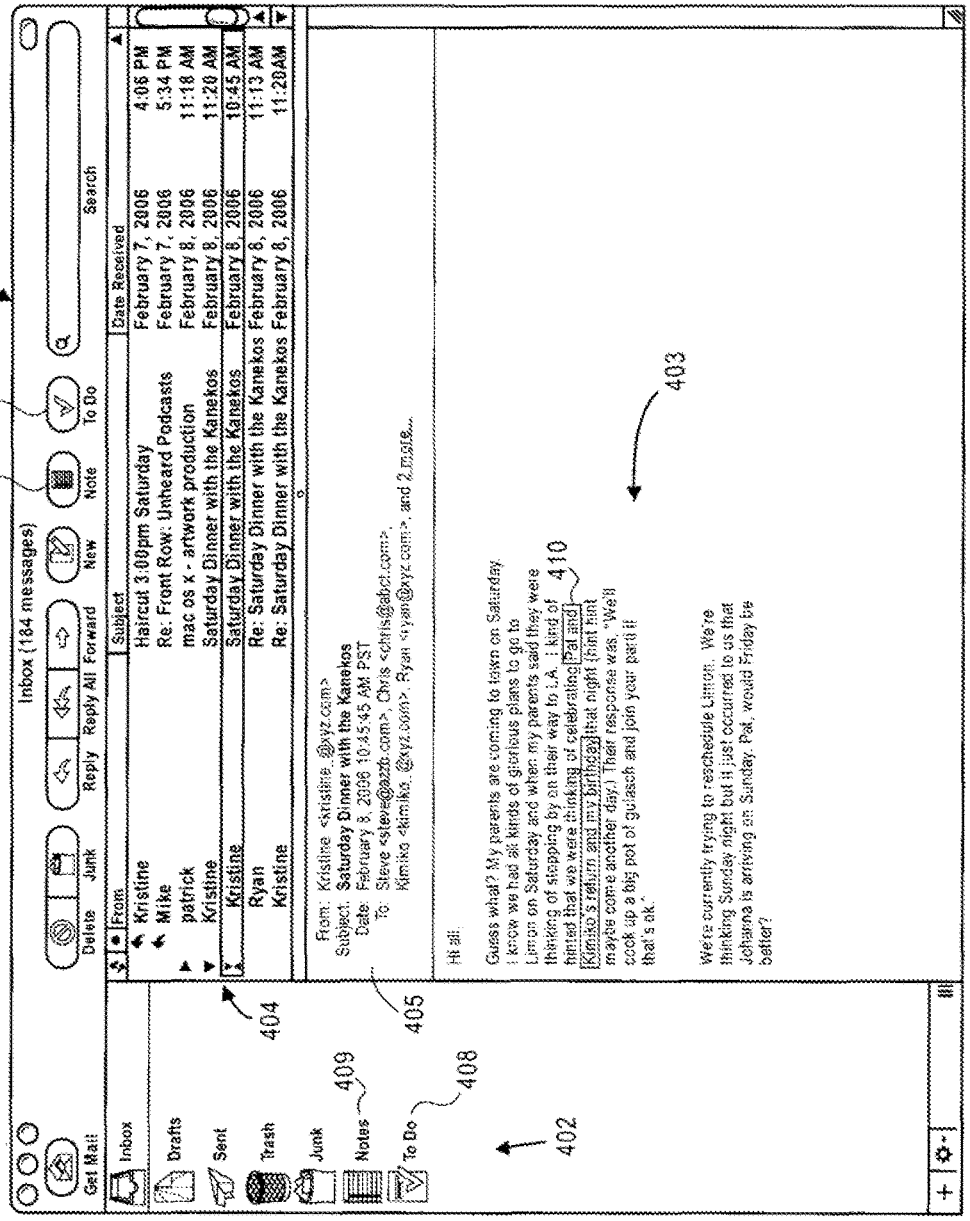

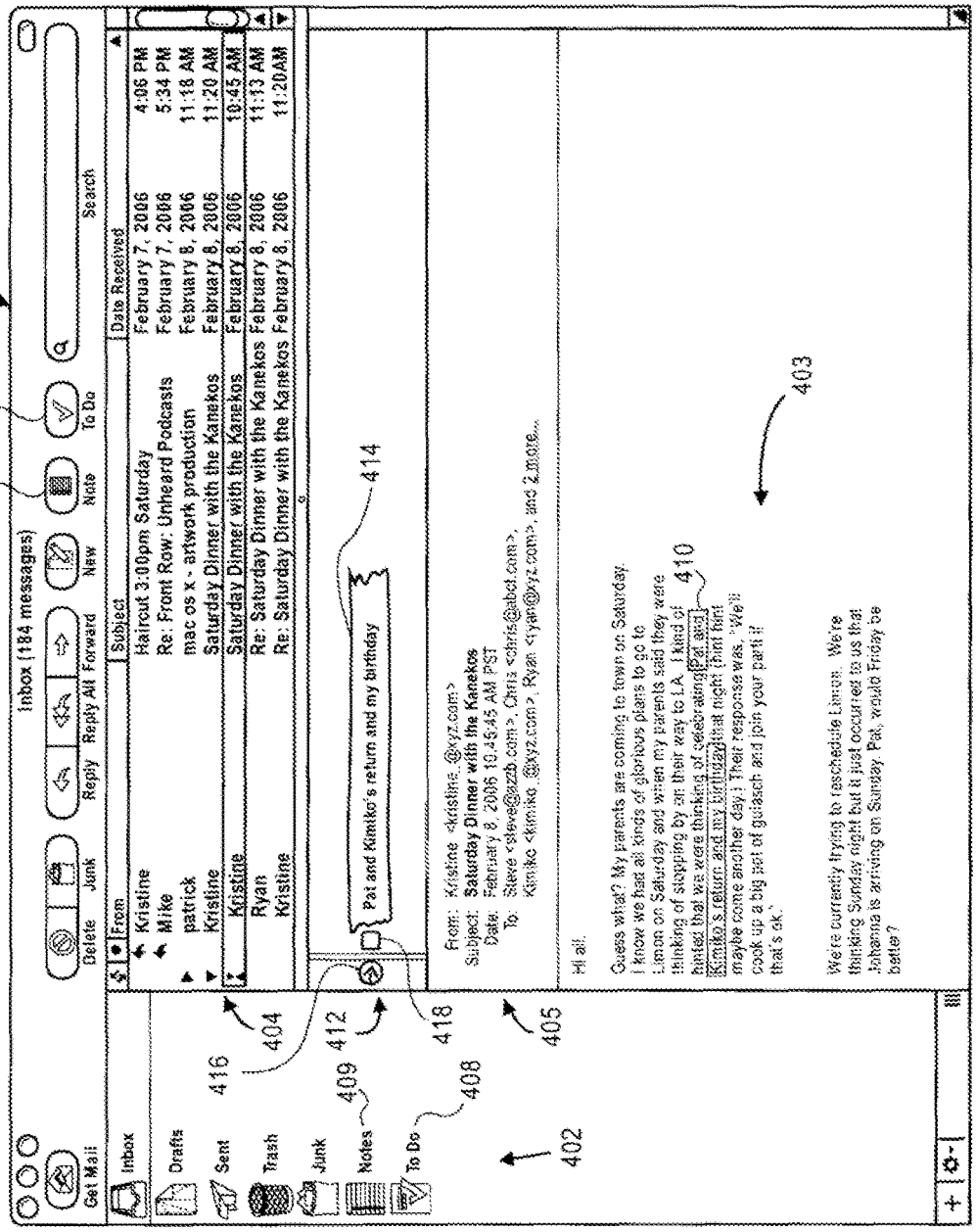

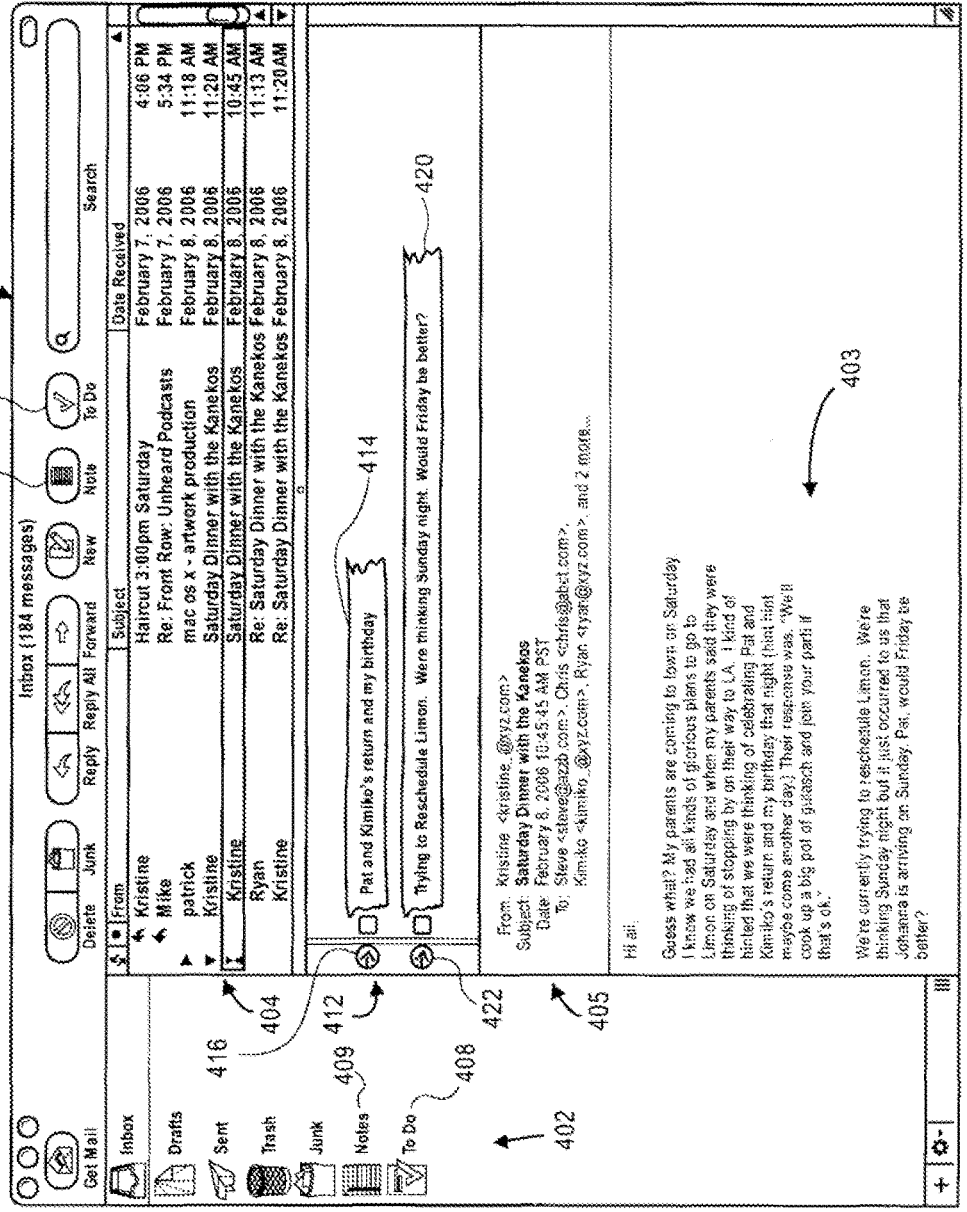

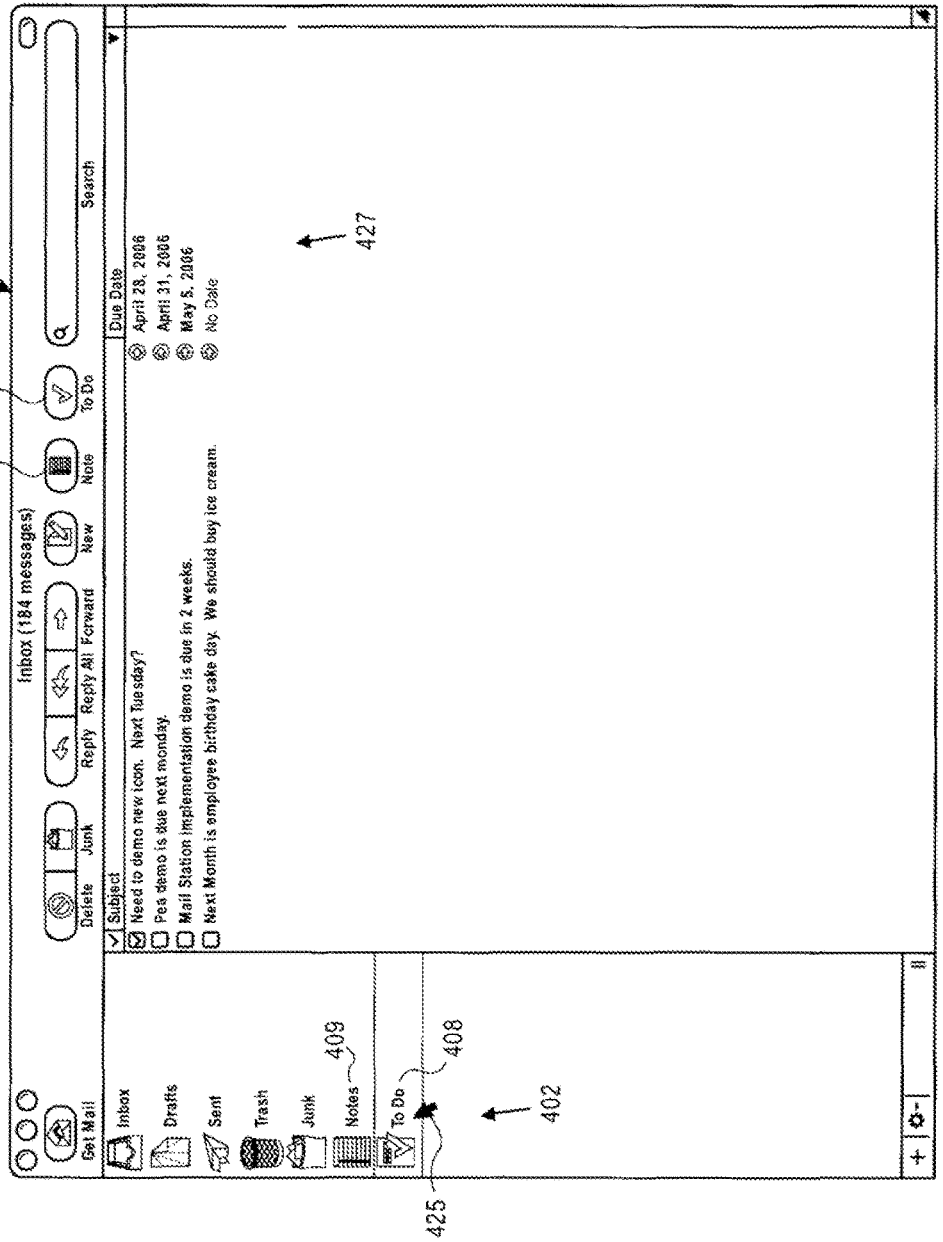

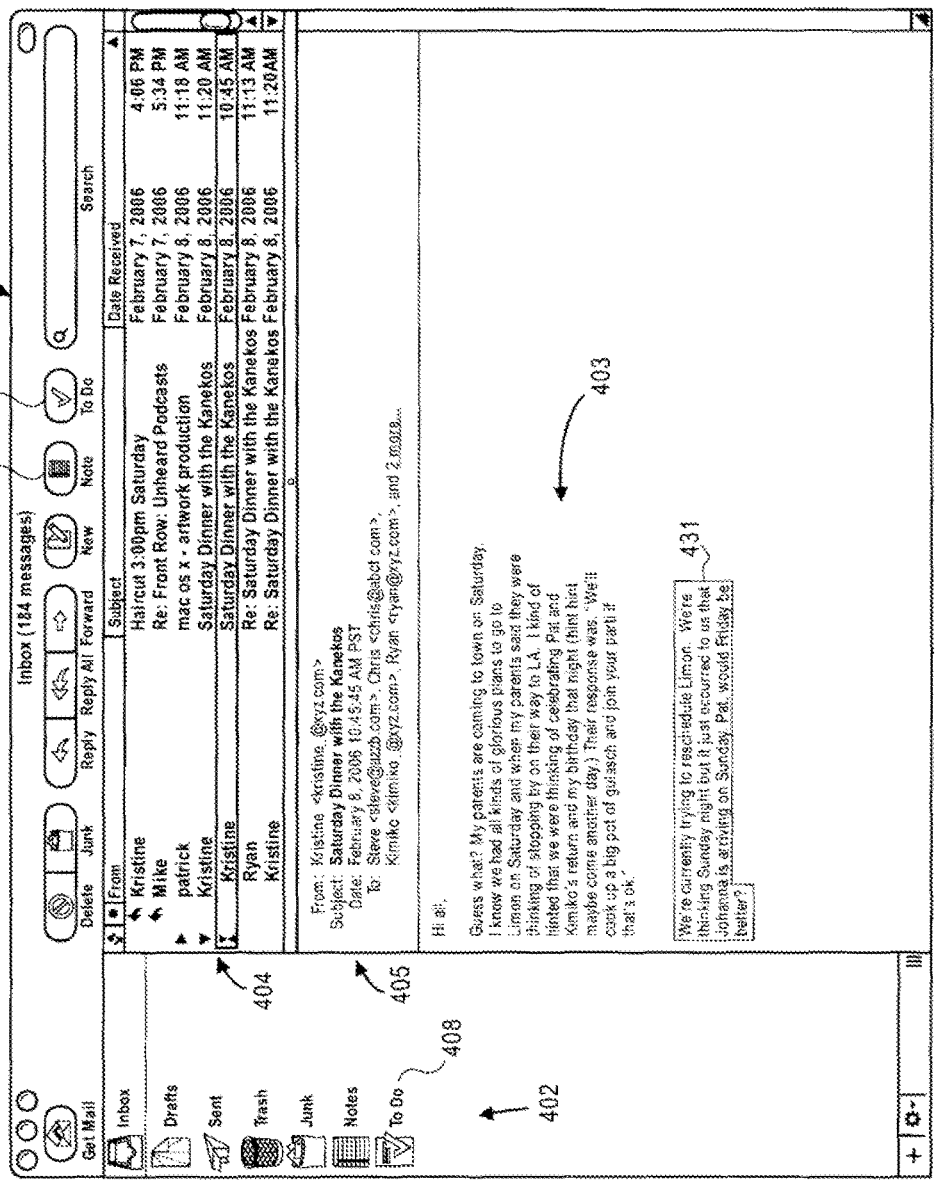

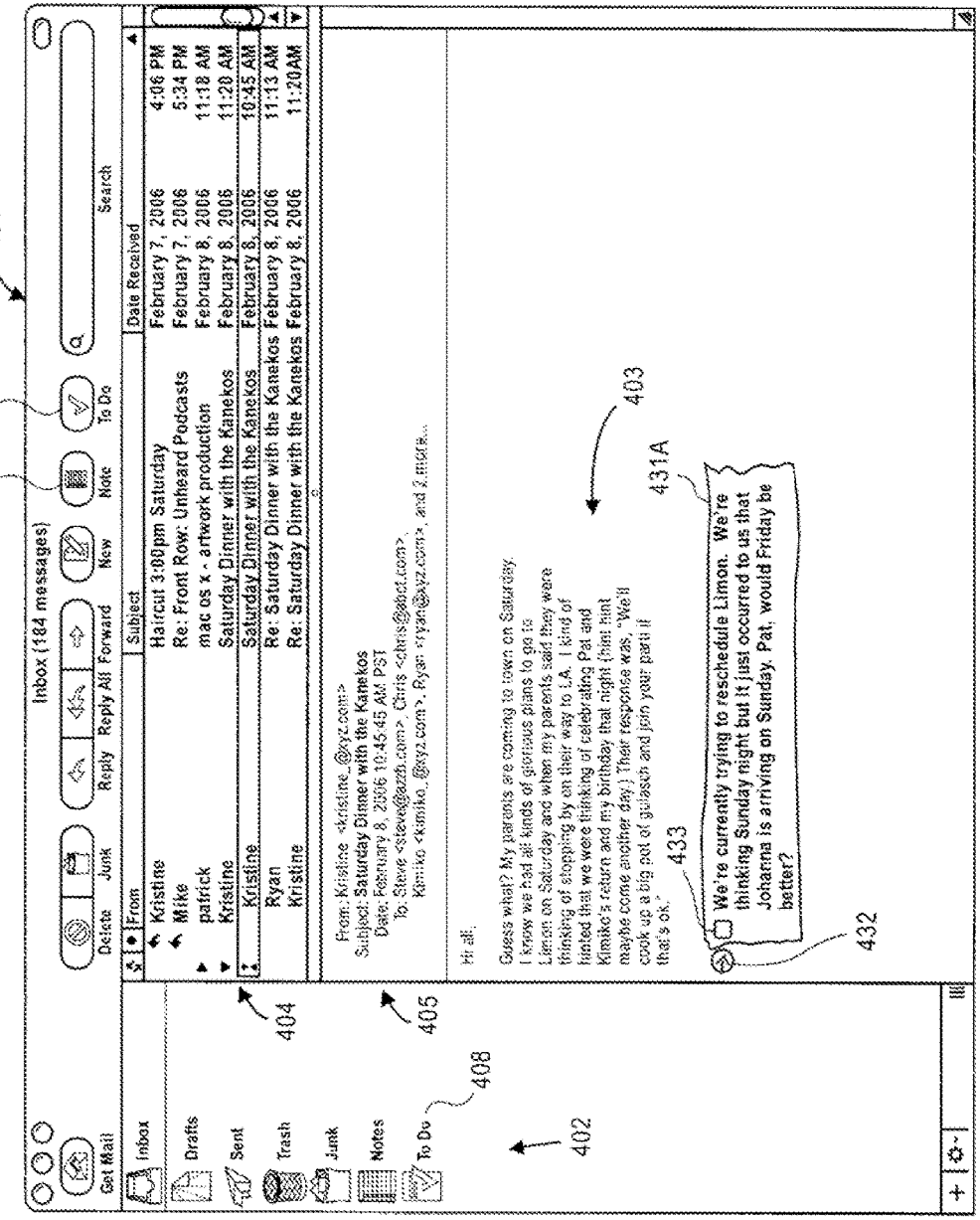

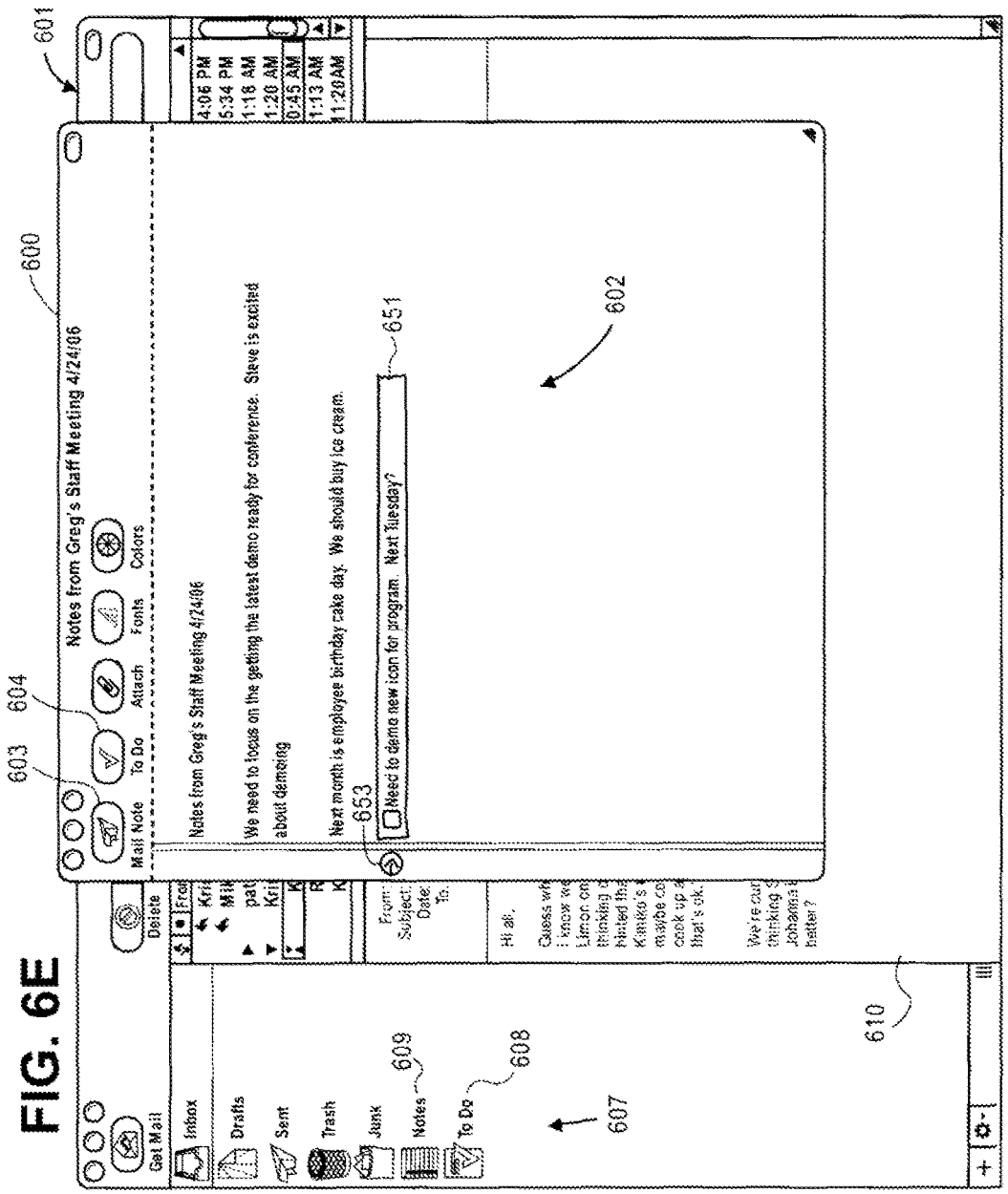

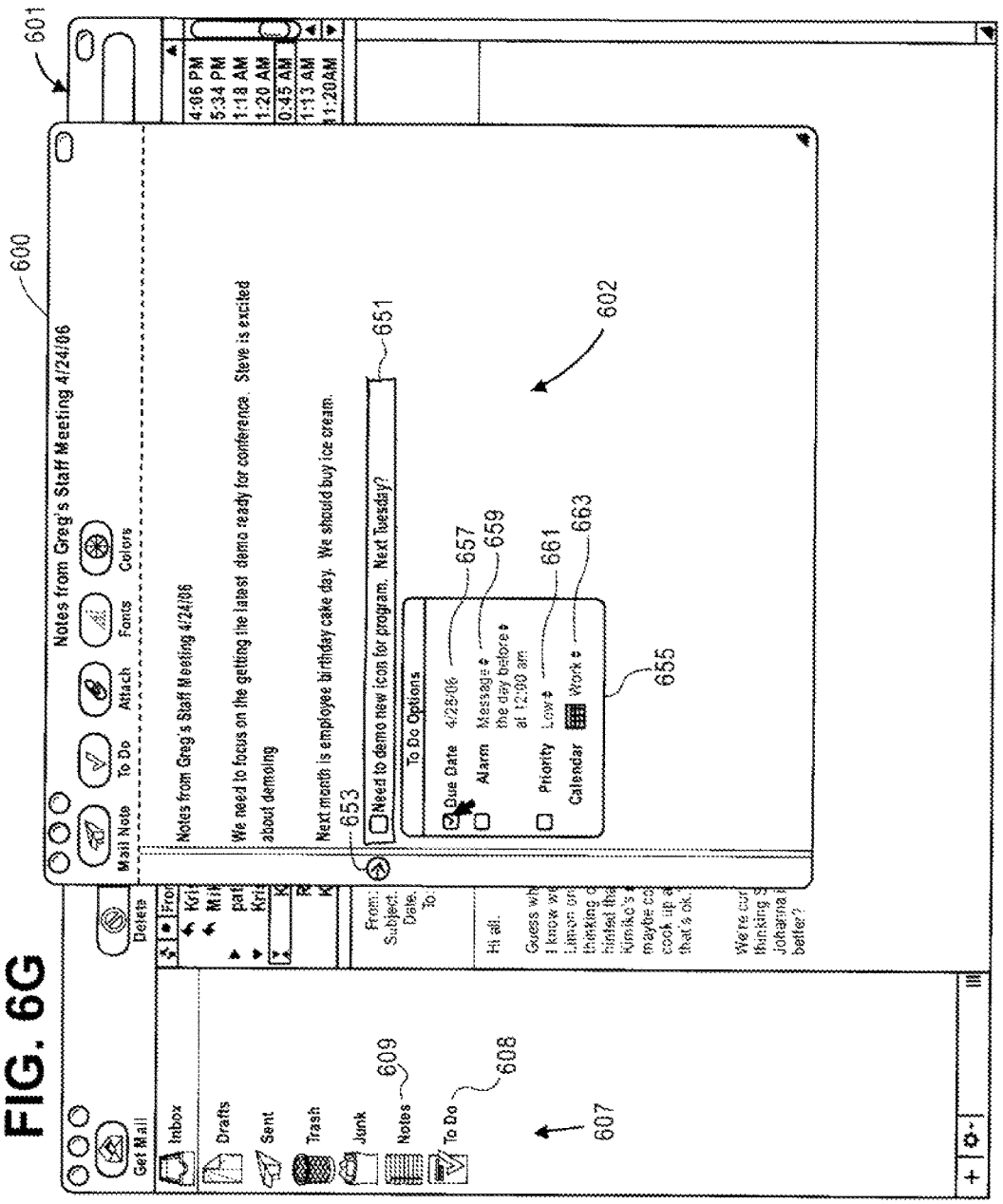

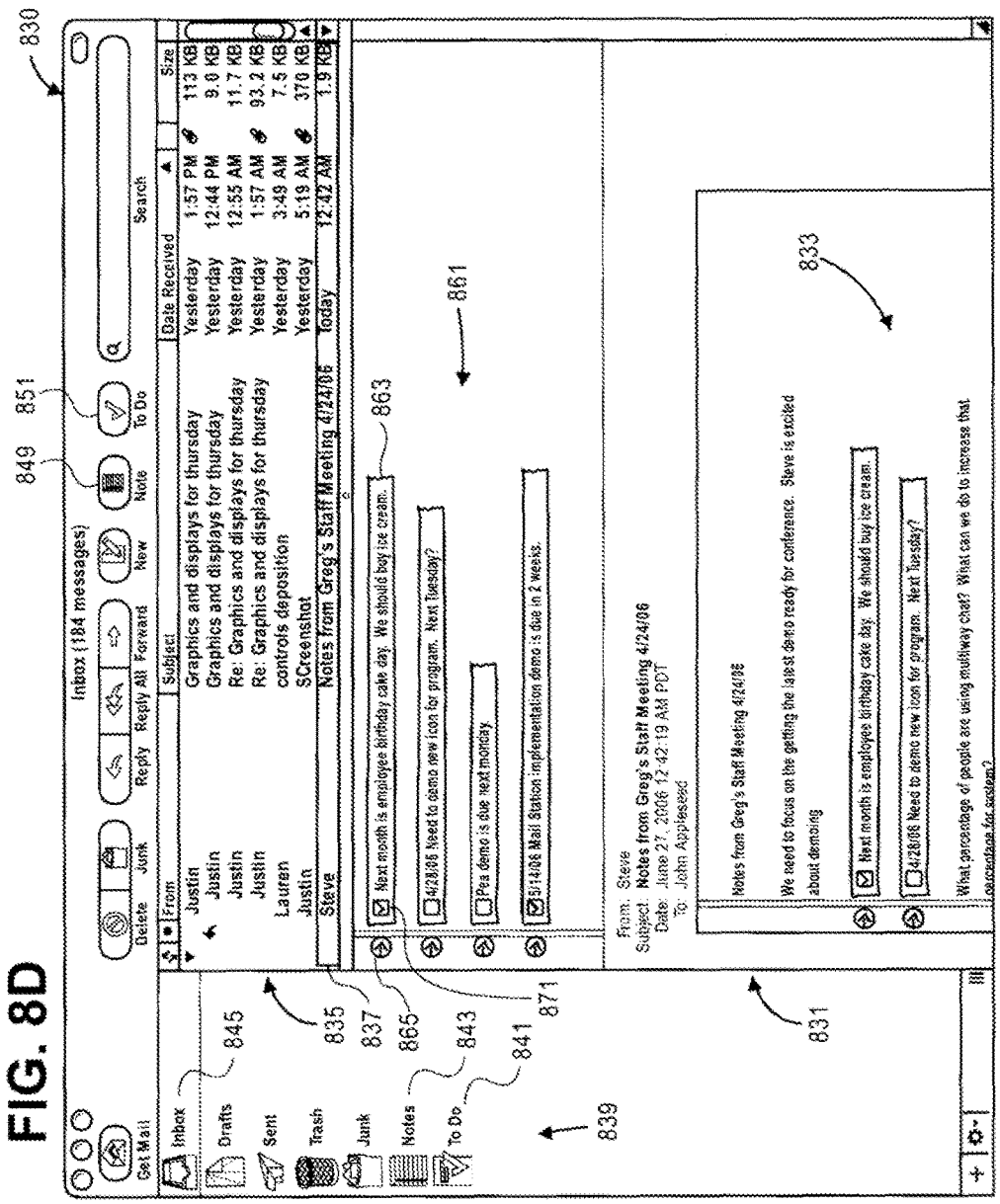

Snapshot Comparison

| Previous Message ID | Current Message ID | Difference Classification |
|---|---|---|
| - | - | no difference |
| 1 | 1 | no difference |
| - | 1 | add |
| 1 | - | delete |
| 1 | 2 | update |
| 2 | 1 | update |

FIG. 20

Comparison of Snapshot Differences

| Message Server Difference | Local Cache Server Difference | Reconciliation Engine Decision |
|---|---|---|
| no difference | no difference | ignore |
| no difference | add | add to message server |
| no difference | delete | delete from message server |
| no difference | update | update message server with value from local cache server |
| add | no difference | add to local cache server |
| add | add | conflict |
| add | delete | - |
| add | update | - |
| delete | no difference | delete from local cache server |
| delete | add | - |
| delete | delete | ignore |
| delete | update | conflict |
| update | no difference | update local cache server with value from message server |
| update | add | - |
| update | delete | conflict |
| update | update | conflict |

FIG. 21

METHODS AND SYSTEMS FOR MANAGING TO DO ITEMS OR NOTES OR ELECTRONIC MESSAGES

CROSS REFERENCE TO RELATED APPLICATIONS

This application claims the benefit of and is a divisional of U.S. patent application Ser. No. 11/760,776, filed Jun. 10, 2007, and entitled, "METHODS AND SYSTEMS FOR MANAGING TO DO ITEMS OR NOTES OR ELECTRONIC MESSAGES"; which is a continuation-in-part of U.S. patent application Ser. No. 11/499,009, filed Aug. 4, 2006 and entitled METHODS AND SYSTEMS FOR MANAGING TO DO ITEMS OR NOTES OR ELECTRONIC MESSAGES.

BACKGROUND

Modern data processing systems, such as a general purpose computer, a handheld computer, a cellular telephone, media players, etc. are typically used for a variety of purposes, including uses relating to maintaining lists of items to do or maintaining notes or information for the user and/or allowing the user to transmit electronic messages, such as email, to other users, often through a network. Certain data processing systems utilize one application program to provide email facilities and another application program to provide a calendar facility. An example of such a data processing system is the Macintosh computer from Apple Computer, Inc. of Cupertino, Calif. An email program known as "Mail" provides email functionality while a separate application program known as iCal provides calendaring functions. There are also examples of an application program which provides a combination of such facilities, such as the program Entourage from Microsoft Corporation, which program runs on a Macintosh computer. The program Entourage includes email functionality as well as a notes functionality, a calendar functionality and a task or To do functionality. To create a To do item, a user must go to the "To do" view (referred to as a "task") and select "New" and then enter information for the new "To do." A user cannot create a To do from an email view or from a note view. They are separate views which the user toggles between by selecting a separate icon for each of those views. The notes functionality is also provided in a separate view in Entourage. A user can copy text in an email while in the email view and then change from the email view to the note view and paste that text into a note. However, the user must switch between the views in order to create a note from text copied from an email.

SUMMARY OF THE DESCRIPTION

Methods and systems for managing information, including To do's, notes, and electronic messaging, such as email, are described herein. A variety of different methods are disclosed, and a variety of different devices which may be performing these methods are also disclosed. In addition, computer readable media, such as machine readable media, are also disclosed for causing a data processing system to perform one or more of these methods.

According to one aspect of the present inventions, an exemplary embodiment of a method includes receiving an input to create a To do item and or a note based on a portion of an email record and creating, in response to the input, the To do item. The input may be the activation or selection of a displayed command interface, through the use of a single button by the user, wherein the displayed command interface is displayed on the same view as the email record. The To do item may be stored in a database for To do items, and this To do item database may be accessible to a calendar program and/or other programs operating on the data processing system. This exemplary method may further include displaying, in response to an input to display To do items, a set of To do items, and receiving an input to convert a note to an email and receiving a command to send the email and causing the email to be sent. The note may be maintained in a note database as a separate item which is separate from the email which is also maintained in an email database; the note may include a pointer to the email.

According to another aspect of the present inventions, an exemplary method includes storing a note having a To do item in the note, the note being stored as an entry in a note database which is separate from a To do database, and storing the To do item in the To do database, and receiving an input within either a note view or a To do view to edit the To do item and causing the note to be edited and causing the To do item to be edited in response to the note. In this exemplary method, the note and the To do item may be dynamically synchronized such that changes to one are reflected in changes to the other. This may be done automatically to the note in a note database and to the To do in a To do database, and the To do database may also be accessible to a calendar application program which can display the To do's. The To do's may be displayed in a list on the calendar application program or at a time and date on the calendar itself.

According to another aspect of the present inventions, an exemplary method includes receiving a selection of text and a command to create a To do item, and determining whether the selection contains a date, and creating automatically, in response to the command, the To do item with the date as the due date. In this method, the data processing system may automatically parse a date found within the selected text, such as text within a note or an email and may, in addition to creating automatically a To do item in response to an input to do so, may also create a due date based upon the date which was parsed from the text which was selected.

According to another aspect of the present inventions, an exemplary method includes receiving an input to convert a note to an email and receiving a command to send the email and causing the email to be sent. According to this aspect, a note, maintained in a note database separately from emails maintained in an email database, can be used to create an email. The email may have a template based upon a note format (e.g. the template makes the note appear as a paper yellow page having horizontal lines on the page). A recipient, in certain embodiments of the email, can convert the email into a note at the recipient's side while maintaining the note template at the recipient's data processing system.

According to another aspect of the present inventions, an exemplary method of processing data includes receiving an input, through a displayed command interface, such as an icon displayed on a data processing's display device, to create a To do item based on a portion of a note displayed concurrently with the displayed command interface and creating, in response to the input, the To do item based on the portion of the note.

Certain embodiments of the present inventions may employ any one of the various disclosed methods to create "To do's" from content in other types of sources (e.g. a web page or a word processing document). Events may also be processed and/or managed in a way which is similar to the use and processing of "To do's" described herein; for example, an event may be considered to be a To do item with start and end time fields (but without a completed status field). The processing of events may automatically detect an address in selected text.

Certain implementations include the use of an IMAP server to synchronize To do's. To do information or metadata may be encoded and stored as an email message on an IMAP server in certain embodiments. Certain embodiments may allow synchronization between multiple machines using multiple transport protocols, and other servers, such as a CalDAV server, may be used.

According to another aspect of the present inventions, an exemplary method includes receiving an input to create one or more To do items based a selected one, or subset, of a plurality of emails and creating, in response to the input, the To do item(s). The selection may be made from list of emails, such as emails received. In a particular embodiment, the To do may be created from the selected email without a further selection of text from the body of the selected email. The To do item created may be stored with a title including at least a portion of the subject of the selected email. In a further embodiment, the selected email may be modified to include a user modifiable badge to signify the status of the To do item create from the selected email.

According to another aspect of the present inventions, an exemplary method includes receiving an input to assign a To do item from a calendar in a first user account to a calendar in a second user account. The assignment input may further be in the form of a "drag and drop" operation. In a particular embodiment, where no particular calendar in the second user account is identified to receive the assignment of the To do item from the calendar in the first user account, a new calendar in the second user account is created automatically to maintain the relationship between the To do item being assigned and the calendar of the first user account from which the item is assigned.

BRIEF DESCRIPTION OF THE DRAWINGS

Embodiments of the present invention are illustrated by way of example, and not limitation, in the figures of the accompanying drawings in which:

FIGS. 4A, 4B, 4C, and 4D show an exemplary user interface which may be used to create a To do from an email, such as a received email.

FIG. 4E shows an exemplary user interface for displaying a list of To do items within a To do database for a user.

FIGS. 4F and 4G show an exemplary user interface in an alternative embodiment for allowing a user to create To do's from an email, such as a received email.

FIGS. 6A, 6B, 6C, 6D, 6E, 6F, and 6G illustrate examples of user interfaces which may be used by a user to create one or more To do items from a note document or form.

FIG. 20 shows a table depicting classifications made during a snapshot comparison in accordance with certain reconciliation methods of the present inventions.

FIG. 21 shows a table depicting decisions made during comparisons of differences identified in snapshots in accordance with certain reconciliation methods of the present inventions.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2006.

Figure 1:
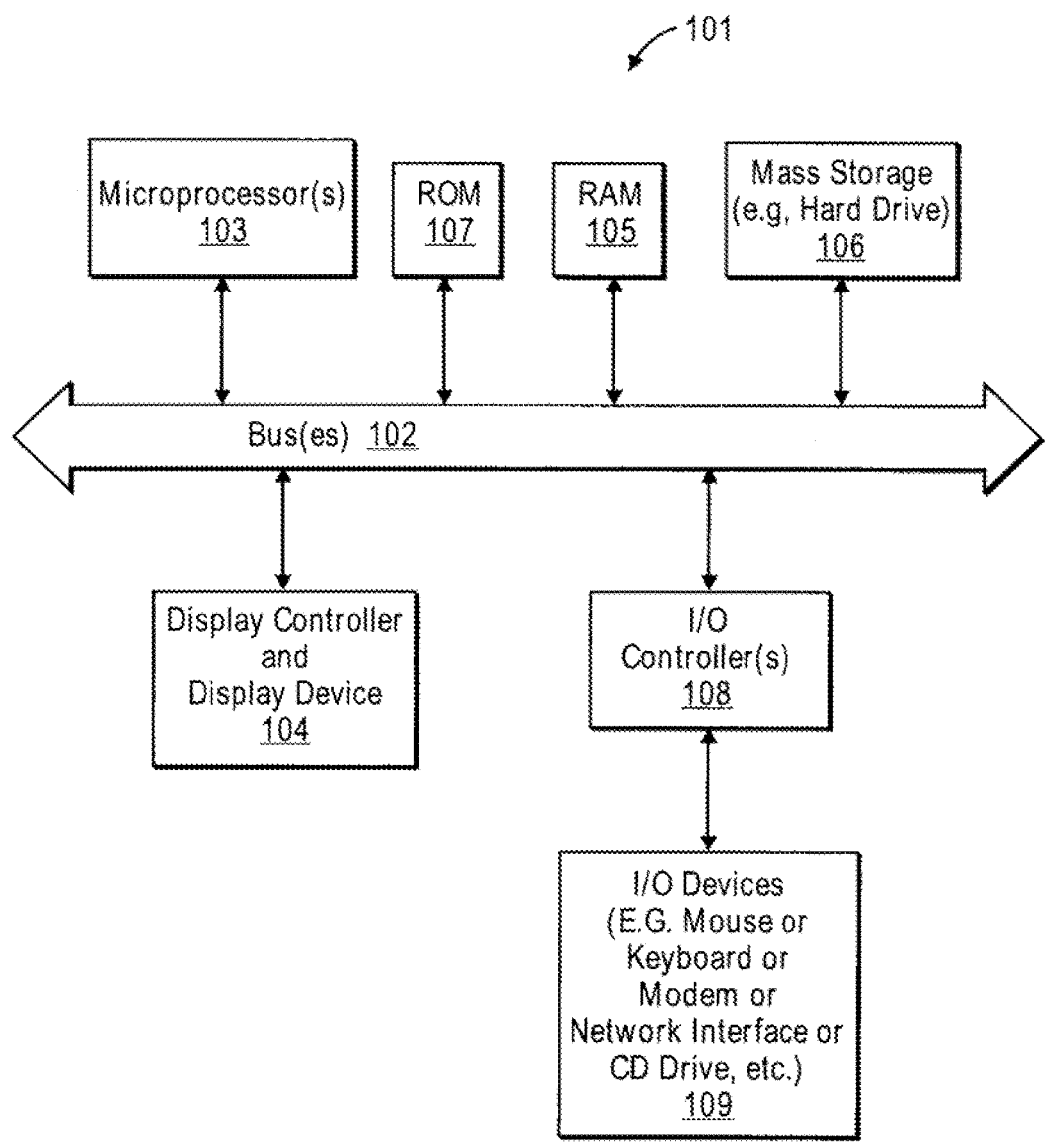
FIG. 1 shows an exemplary embodiment of a data processing system which may be a general purpose computer system or other types of data processing systems and which may operate in any one of the various methods described herein.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that personal digital assistants (PDAs), cellular telephones, media players (e.g. an iPod), devices which combine aspects or functions of these devices (e.g. a media player combined with a PDA and a cellular telephone in one device), network computers, an embedded processing device within another device, and other data processing systems which have fewer components or perhaps more components may also be used to implement one or more embodiments of the present inventions. The computer system of FIG. 1 may, for example, be a Macintosh computer from Apple Computer, Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a microprocessor or set of microprocessors from Intel or a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 2:
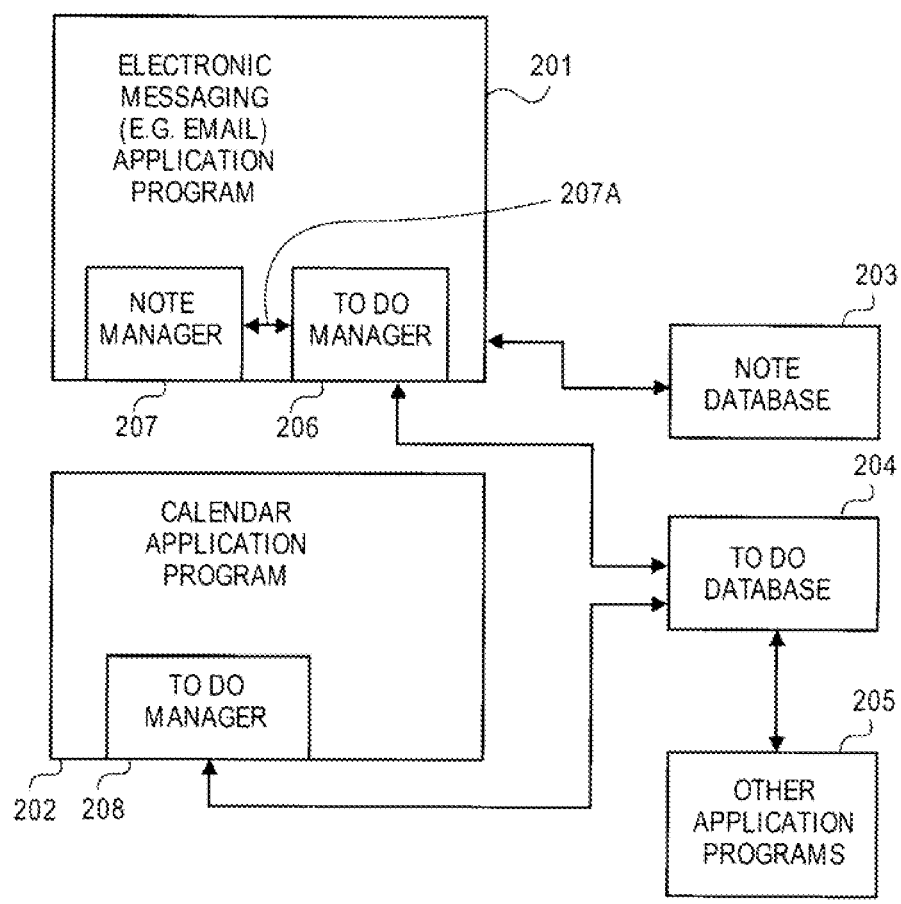
FIG. 2 shows an example of a software architecture having a system wide To do database and a note database which interact with an electronic messaging application program and a calendar application program; in alternative embodiments, the electronic messaging application program and the calendar application program may be integrated together in one application program.

FIG. 2 illustrates an exemplary software architecture and data structure which may be used with at least certain embodiments described herein. In alternative embodiments, one or more of the components may be combined together to form an integrated system. In the example shown in FIG. 2, an electronic messaging application program 201 includes a note manager 207 and a To do manager 206, each of which assist the electronic messaging application program 201 to interface with a note database and a To do database, respectively. In particular, the To do manager 206 interfaces with the To do database 204 and the note manager 207 interfaces with the note database 203. The electronic messaging application program may be a typical email program which allows a user to receive and send and create emails. The To do manager 206 allows a user to view a list or other form of To do items and to also create and edit To do items. The note manager 207 allows a user to view and create and edit notes. Further, it allows a user to convert a note into an email and to also convert a received email which has a note back into a note for storage as a note within the note database. As described below, the email application program may, in at least certain embodiments, allow a user to select a portion or all of the content of an email and then to convert that portion into a To do item which is stored in the To do list all within the same email view, without having to go to a separate view, such as a To do view. The To do's are stored in the To do database 204 which is also capable of being accessed by the calendar application program 202 which also includes the To do manager 208 which also interfaces with the To do database 204. As shown in FIG. 2, other application programs 205 may also interface with the To do items in the To do database 204. For example, a project management computer program may be able to access To do items within the To do database 204, and those To do items are synchronized between both the email program and the calendar program and the project management program, such that changes to a To do item from any of those programs are reflected in the database 204 which can then reflect those changes when the To do items are viewed either the calendar or in the email application program or other programs. In certain embodiments, a user may be viewing a calendar presented by the calendar application program and then select a command to view the note for a To do (e.g. a note containing the To do), wherein the note is displayed by the email application program. The note database, while not shown being interfaced with other application programs, may similarly be interfaced with other application programs, including the calendar application program 202 and potentially other application programs 205 in at least certain embodiments.

The architecture of the software or data structures shown in FIG. 2 allows the To do's within a note and To do items in the To do database to be actively synchronized or linked live such that a change to the To do item in the note will get reflected to the same To do item in the To do database, and vice versa. This is shown by the link 207A which links the To do manager 206 with the note manager 207. Each To do item may include an identification number which is used by both managers to reference the corresponding To do items in both the note database 203 and the To do database 204. This, in at least certain implementations, allows the To do items to be synchronized in a live manner such that a change being entered in an editable text document, such as a note, will be reflected in the corresponding text of the To do in the corresponding To do item. Similarly, when a user edits a To do item in the To do database, the To do manager can notify the note manager through link 207A that a particular To do item has been modified and the note manager will, in turn, modify the content of the corresponding note containing that To do item. In certain embodiments, with this architecture, a To do can point to the originally selected text of the message (e.g. the incoming email), and a note can point to the original message, and an email message can point to the note associated with the message.

In an alternative software architecture, the email program and the calendar application program, along with their managers, may be integrated together in a single application program. Further, in a yet another alternative embodiment, the databases may be combined together.

Figure 3:
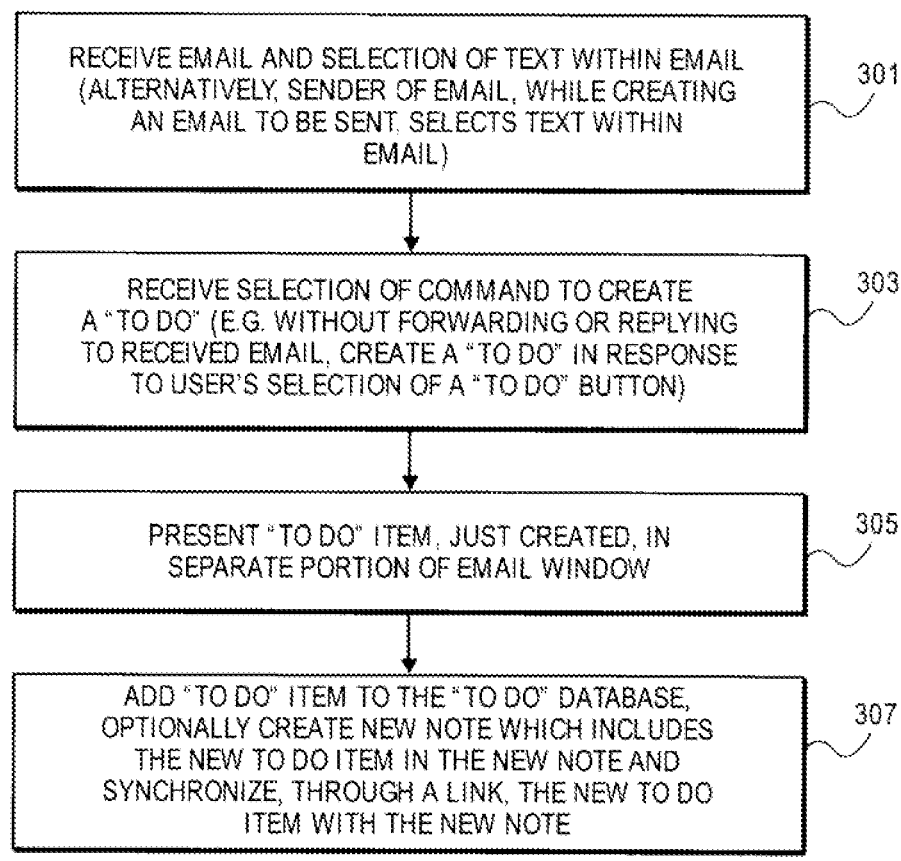
FIG. 3 is an exemplary method according to certain aspects of the present invention.

FIG. 3 shows an exemplary method for creating To do items from an email, such as a received email. This method may be employed with the exemplary user interface shown in FIGS. 4A, 4B, 4C, and 4D. In operation 301, an email is received by the data processing system which also receives a selection of text within the email. The selection may occur by a variety of different techniques known in the art, including a technique in which a user positions a cursor at a point in the text and then presses a button and holds the button in a position while moving the cursor to drag the cursor over the text to be selected. This will produce a selection of text, such as the selection 410 shown in FIG. 4B. Rather than a received email providing the text which is selected, in an alternative embodiment, the sender of an email, while creating the content of the email to be sent, selects text within the email and uses that selection as the selection of text to create a To do in subsequent operations. In operation 303, the data processing system receives a selection of a command to create "To do" item. This may be done without forwarding or replying to the received email. This may be done merely by "clicking" on a "To do" button such as the To do button 407 shown in email window 401. In this case, the user may position a cursor, using a cursor control device such as a mouse, over the To do button and may press a button, such as the mouse's button, to select the command to create the To do. Alternative user interface techniques may be employed to create a To do as well; for example, one or a sequence or a set of keystrokes, either in sequence or concurrently, may be used to provide the command which indicates to create a To do item. In an at least certain implementations of an embodiment, the newly created To do item may be presented in a separate portion of the email window, such as the portion 412 shown in FIG. 4C. The presentation of the To do item may include the text which was selected to create the To do item as well as a To do interface input control, such as the To do interface input control 412 as shown in FIG. 4C. In operation 307, the To do item which has been created is added to a To do database which is a collection of To do items created and maintained by the system. In one exemplary embodiment, a note document also gets created in operation 305. This note document may, in fact, be the document being shown in the view of the To do item presented in operation 305. Thus, for example, the view shown in the screen region 412 of the email window 401 may be a note view showing a To do item on a note within the email window. The note is maintained in a note database, such as the note database 203 and the content of the To do item in the note may be synchronized with the To do item in the To do database, such as To do database 204. In a typical implementation, the note created in operation 305 is associated with a particular email from which the To do and note was created. The note can be edited to add text and other data and remain associated with the email. In this manner, the note may be used to annotate the email and can be displayed concurrently or otherwise in association with the email with which it is associated. In addition, in at least certain embodiments, a user interface feature may be selectable by a user, when displayed or otherwise presented, to cause a To do shown in a note to show the source of the To do in the associated email. For example, a button or other displayed command interface associated with a To do on a note may be activated to present the portion of the email which contains the selected text which was used to create both the note and the corresponding To do item.

FIGS. 4A, 4B, 4C, and 4D show examples of user interfaces which may be used to create a To do item and optionally a note item or document from an email, such as a received email. In alternative embodiments, the notes and/or To do item may be created from an email which is being created by the sender of an email. The email window 401 includes a mailbox view area 402 which displays a plurality of individually selectable items, including an inbox item, which is selected for display currently in the email window 401 shown in FIG. 4A, as well as a notes collection button 409 and a To do collection button 408. A view 404 of received emails is shown as a list in the view 404 within email window 401. An email header portion 405 is also shown in the email window 401. The body of an email 403 includes user selectable or system selectable text from a received email, even though the email has not been replied to or not yet been forwarded. The selection of text is shown in FIG. 4B which shows the selection 410 which is to be used to create a new To do item. As noted above, the user may employ a variety different user interface techniques, such as dragging a cursor over the desired text to select the text. After selecting the text, the user may select the To do button 407 to thereby cause the creation of at least a To do item and optionally also a note document as reflected in FIG. 4C. As explained above, a variety of different user interface techniques may be employed to select the To do button or to otherwise select a command to cause the creation of a new To do item. In one embodiment, the user may position the cursor over the To do button 407 and then press and release a button, such as a mouse's button. It will be appreciated that in alternative embodiments, the user may first click or select the To do button 407 and then select the text and indicate the end of a selection of the text, which in turn causes the system to create a To do item and optionally also a new note document. The result of the creation of the new To do item in at least one embodiment is shown as FIG. 4C, in which the note view 412 shows the new To do item as part of a new note. The new To do item is saved, in at least one implementation, in the To do database 204 and the new note is saved in the note database 203. The To do item 414 shown in the note view 412 includes a To do interface input control 416 and a "done" check box interface 418. The To do "title" shown in the To do item 414 defaults to the originally selected text from the email, but it may be edited without disrupting the relationship or association with the original email; in one implementation, this is archived by having the note, created with the To do item, be a "container" for the To do and have the association with the email. The To do interface input control may be used to open and close a To do input panel which can receive inputs indicating information about the To do, such as due date, alarm status, priority level, and calendar name input. The "done" check box interface can receive an input indicating that the To do item is done or otherwise completed. Additional To do's may be created from the same email as shown in FIG. 4D. In one particular implementation, these additional To do items are added to the same note which was initially created with the initial To do item 414. This note, as described above, may be associated with this email and may be retained in the system even if the email is subsequently deleted. The note may, in at least certain implementations, be synchronized through a live link described herein with the corresponding To do items on the note. Hence, editing of the To do items on the note will be reflected in the corresponding To do items in the To do database, and editing of the To do items through a To do view (e.g. the view available after selecting a To do item from the list of To do items shown in FIG. 4E) will be reflected in the data for the To do items maintained in a note document which in turn is maintained in a note database, such as the note database 204. The To do item 420 shown in FIG. 4D also includes a To do interface input control 422 which may be used to enter information about the particular To do item.

A user may desire (or the system may provide) the ability to switch between the email view shown in FIG. 4D in which the body of an email is presented within an email window, or a list of emails, such as the list view 404, is presented within an email window. The user may switch to a view of To do items by selecting the To do collection button 408 which causes the system to display To do items in the window 401A shown in FIG. 4E. This window 401A shows a view of To do items in a list in the view 427. In one embodiment, the user may select the To do collection button 408 by positioning a cursor 425 over the To do collection button within the mailbox view area 402. Within this To do item view, a user may select one of the To do items and edit the To do item, and the edits made in the To do item will be reflected for that item in the To do database and those changes will also be reflected to the corresponding To do's in the notes maintained in the note database 203 in at least certain embodiments.

FIGS. 4F and 4G show an alternative user interface in which an email is used to create a new To do item. In this alternative embodiment, the text or other information is selected within an email, such as a received email. Thus, selected text 431 is shown in the body of the email 403. This selection may be performed by the user dragging a cursor over the text in manners known in the art or by use of other known user interface techniques for selecting text. The user may then select the To do button 407, thereby causing the selected text to be turned into a new To do item. In another embodiment, the sequence of operations may be reversed such that the To do button 407 is first selected and then the text is selected with an indication of the end of the selection of the text so that the system can determine what text has been selected for the new To do item. In response to creating a new To do item, a To do item 431A is displayed within the body of the email 403 as shown in FIG. 4G and a To do interface input control 432 is also displayed adjacent to the new To do item 431A within the body of the email. In addition, a "done" check box interface 433 is also displayed adjacent to the new To do item 431A. Notes and/or To do's may be, in this alternative embodiment or in other embodiments, intermixed with email messages.

Figure 12:
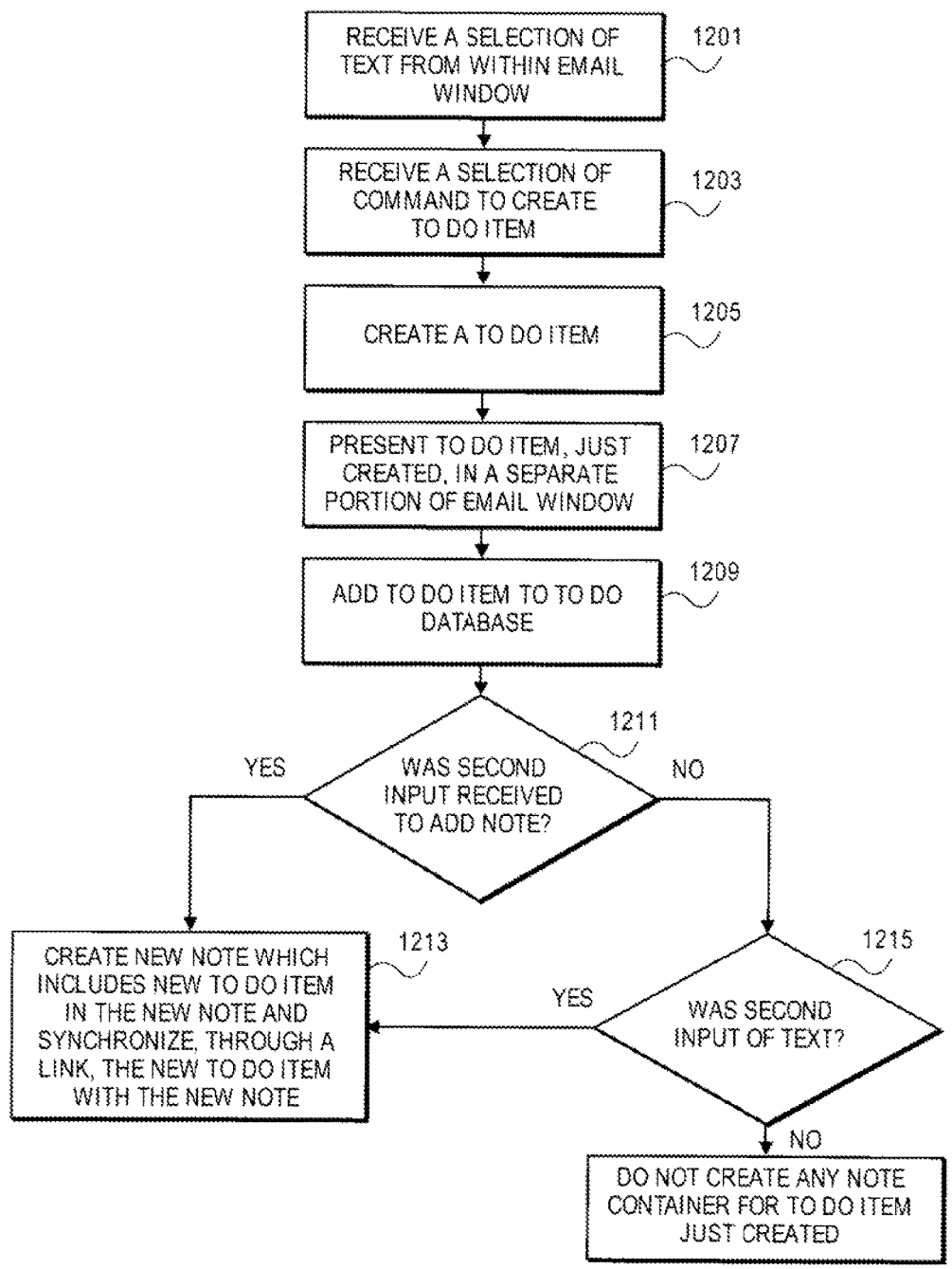
FIG. 12 is a flowchart illustrating an exemplary method according to certain aspects of the present inventions.
Figure 13A:
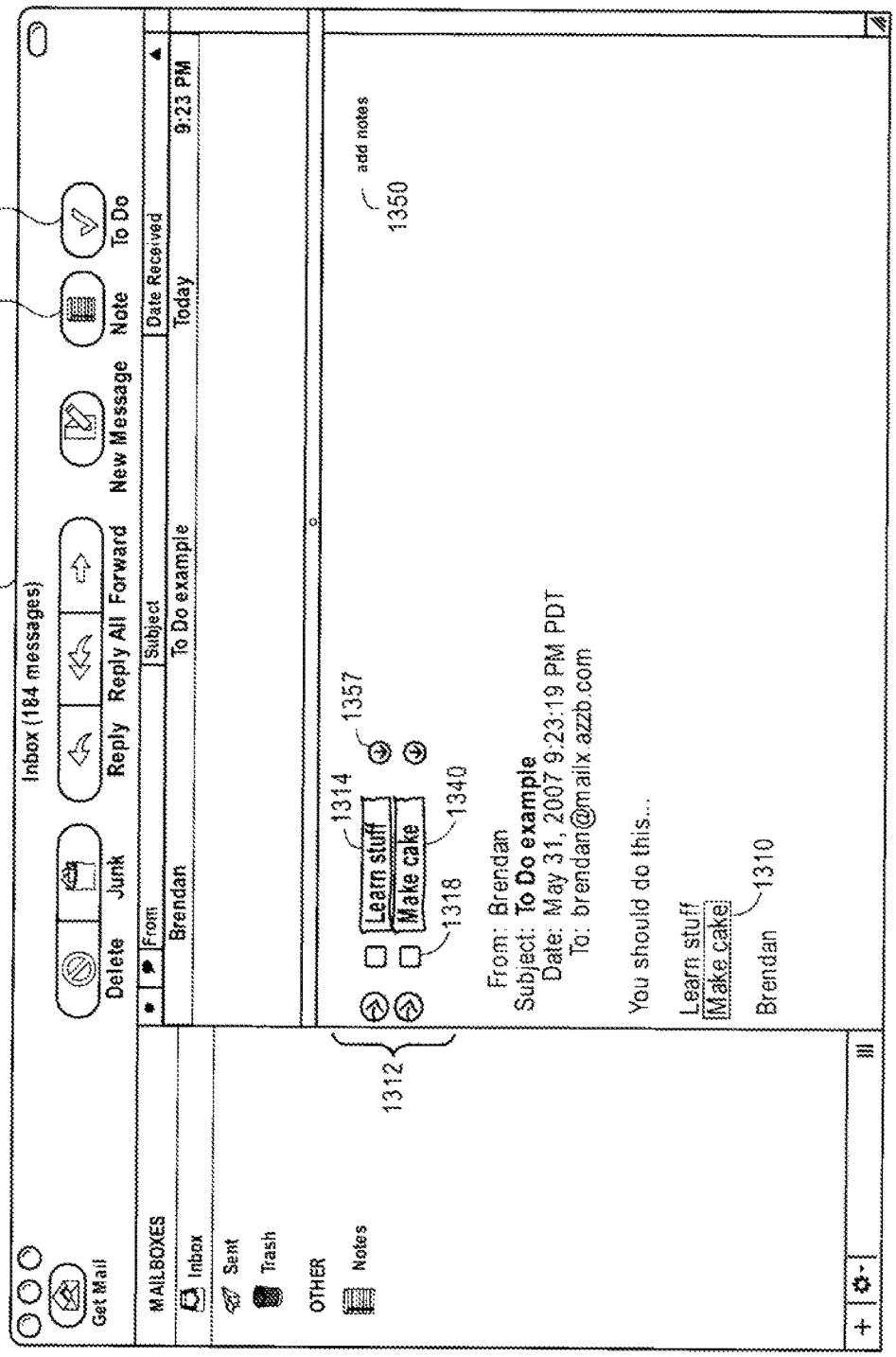
FIGS. 13A, and 13B show an exemplary user interface which may be used to create a To do from an email, such as a received email.

FIG. 12 shows an exemplary method for creating To do items from an email, such as a received email, without also creating a note container, and subsequently adding a note container for created To do items only upon receiving a second input from the user. A similar method may be practiced to create a note from an email, without creating a To do item, and subsequently adding a To do item to the note only upon receiving a second input from the user. These methods may be employed with the exemplary user interface shown in FIGS. 13A and 13B. In operation 1201, the data processing system receives a selection of text within the email. The selection may occur by a variety of different techniques known in the art, including a technique in which a user positions a cursor at a point in the text and then presses a button and holds the button in a position while moving the cursor to drag the cursor over the text to be selected. This will produce a selection of text, such as the selection 1310 shown in FIG. 13A. Rather than a received email providing the text which is selected, in an alternative embodiment, the sender of an email, while creating the content of the email to be sent, selects text within the email and uses that selection as the selection of text to create a To do in subsequent operations. As shown in FIG. 13A, the selected text 1310 may further provide the title of the To do item 1340. Alternatively, the title to To do item 1340 may be substantially simplified by the user from the text originally selected from the email record to create the To do item. In one such implementation, control 1357 provides access to the original text selection that was made when creating the To Do, even if the title to the To do item is subsequently changed.

As further shown in FIG. 13A, the To do list including To do item 1314 and 1340 may be created through successive selections of text, such as making selection 1310 an To do added to the To do 1314 made from a separate selection of text, as described elsewhere herein. In such an embodiment, selection of multiple items of text creates only a single to Do item. In certain other embodiments, however, a selection of delimited text creates a plurality of to Do items from the single selection. In one such embodiment, upon the user selecting text in a note containing delimiters, such as those commonly known in the art including, but not limited to a carriage return, comma and semicolon, the data processing system parses the selection based on the delimiter and creates a To do item for each item of the selection. Thus, To do creation may be context sensitive with respect whether the To do is created from a received email or is created from a note. Such context sensitivity enables the data processing system to receive an implicit command from the user to create a plurality of To do items merely by proper format of the text input into a note.

In still another embodiment, an embedded item in an email is the portion of the email from which a To do item is created. The embedded item may be any embedded item commonly provided within an email, such as, but not limited to, portable documents, spreadsheets, word processing documents, audio/visual files such as pictures, music and movie files. Upon receiving a selection of an embedded item and selection of a command to create a To do item from the embedded item, the data processing system creates the To do item. Depending on the nature of the embedded item selected, a note may further be generated concurrently with the generation of the To do item. The To do item or the note item created may contain a link to the embedded item. Thus, in an exemplary embodiment, where an email is received containing the text, "Review the attached draft by Friday," a To do may be created upon receiving of a selection of the text, as previously described, or upon receiving a selection of the attached or embedded draft file. In one such embodiment, the data processing system uses the title of the to draft as the title of the To do item.

In operation 1203, the data processing system receives a selection of a command to create "To do" item. This may be done without forwarding or replying to the received email. This may be done merely by "clicking" on a "To do" button such as the To do button 1307 shown in email window 1301, or by alternate means previously described or common to the art. The data processing system then creates the To do item at operation 1205. In an at least certain implementations, at operation 1207, the newly created To do item may be presented in a separate portion of the email window, such as the portion 1312. The presentation of the To do item may include the text which was selected to create the To do item as well as a To do interface input control, such as the To do interface input control 1318. In operation 1209, the To do item which has been created is added to a To do database which is a collection of To do items created and maintained by the system.

As shown in FIG. 13A, To do items 1314 and 1340, are created and displayed without also creating a note to contain either created To do item. In this exemplary method no additional note is created to contain a To do item unless the data processing system receives a further explicit selection of a command to add a note or receives a further input implicitly requiring a note to be added. Such embodiments advantageously avoid creating a note container object every time a To do item is created in favor of creating a note container object only when information beyond that provided by the To do item is desired. Thus, a To Do item alone may, in fact, be the document shown in the view of the To do item presented in operation 1207.

In one implementation, at operation 1211, the data processing system receives an explicit selection of a command to add a note to a To do item, such a selection of "add notes" control 1350, shown in FIG. 13A. Upon receipt of a selection of "add notes" control 1350 at operation 1211, the data processing system creates a new note at operation 1213. In an alternative implementation, rather than receiving an explicit selection of a command to add a note, the data processing system receives an input of free form text entered into a separate portion of the email window. Such text implicitly requires a note container to be added. In one embodiment, as shown in FIG. 13A, the free form text is received at operation 1215 when the portion of the email window 1312 has been selected or otherwise given focus via means common in the art. Upon receiving such input of text, the data processing system, at operation 1213, creates a note to contain the received text input and also contain the To Do item(s) displayed concurrently in the separate portion of the email window. In one implementation, the data processing system puts the free form text and new To do items into a newly created note, stores the note in the notes database and synchronizes, through a link, the new To do item with the new note, as described elsewhere herein.

Figure 13B:
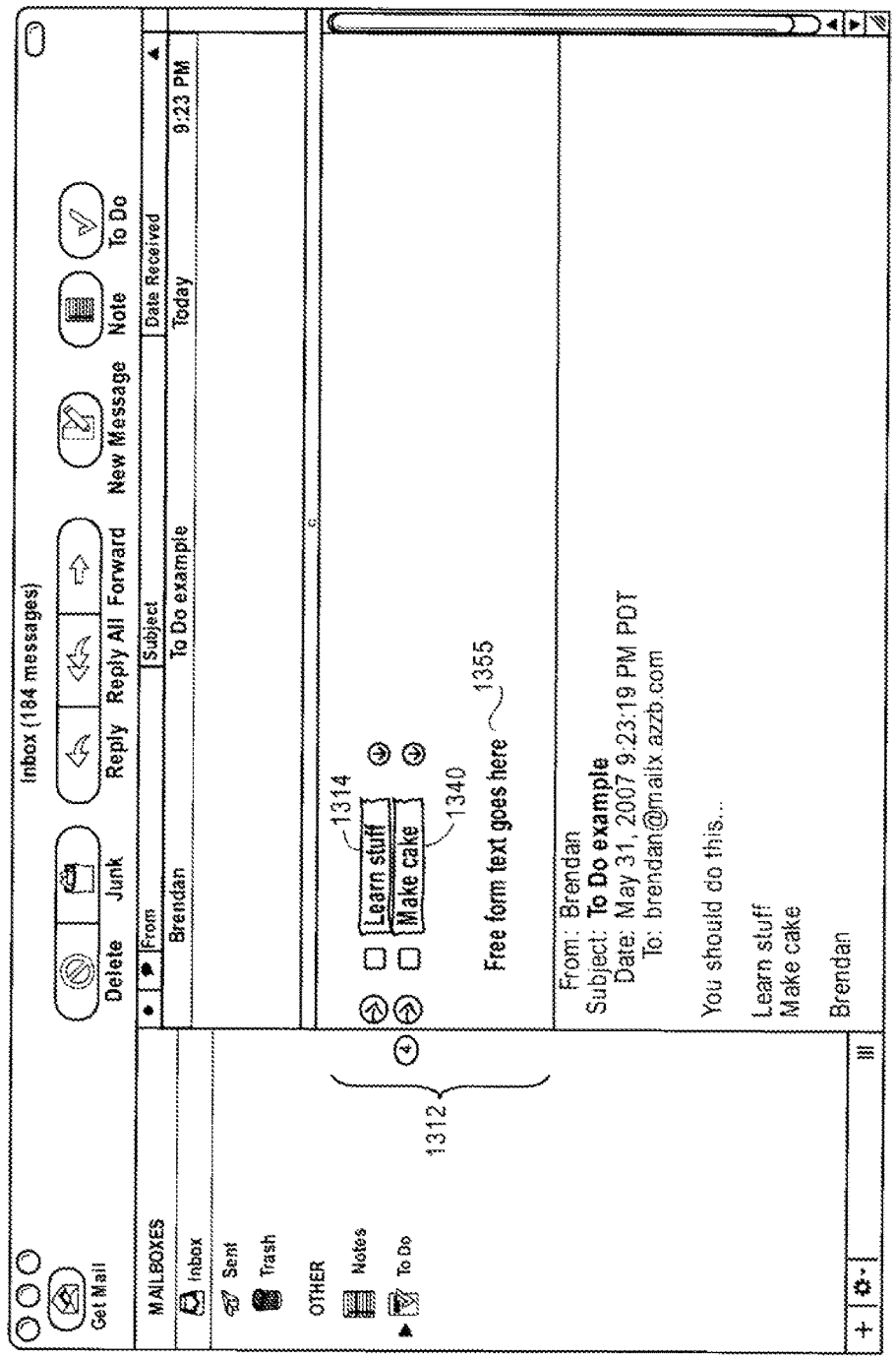

As shown in FIG. 13B, upon the creation of the new note, the display of the To do item in the embedded view within the email window is modified to signify the existence of the newly created note. In one particular embodiment, To do items 1314 and 1340 may be presented in a separate portion of the email window, such as the portion 1312, along with a text editable field containing free form text 1355, received as input subsequent to receipt of a selection of the "add notes" control 1350 or received as an implicit command to add a note. In such an embodiment, both To do items 1314 and 1340 as well as free form text 1355 are contents of the newly created note. In other implementations, the display of the To do item may be further modified to have a note template having horizontal lines and/or colored to resemble a paper page.

It should be appreciated that analogous methods may be applied to create a note from an email, without first creating a To Do from the email. Specifically, a note embedded in the email view and linked to the email may be created by "clicking" on a "Note" button such as the Note button 1308 shown in email window 1301, or by alternate means previously described or common to the art. Furthermore, just as methods herein describe creating a note container after creating a To do item contained in the note, analogous methods may be practiced to create a To do item contained in a note after the note is created. In an exemplary embodiment, after first creating from an email window, a note containing only free form text entered at the time the note was created, a To do item is added to the note in response to a second input. The second input to add a To do item to an existing embedded note may be any of those described elsewhere herein to create a To do item.

Figure 14:
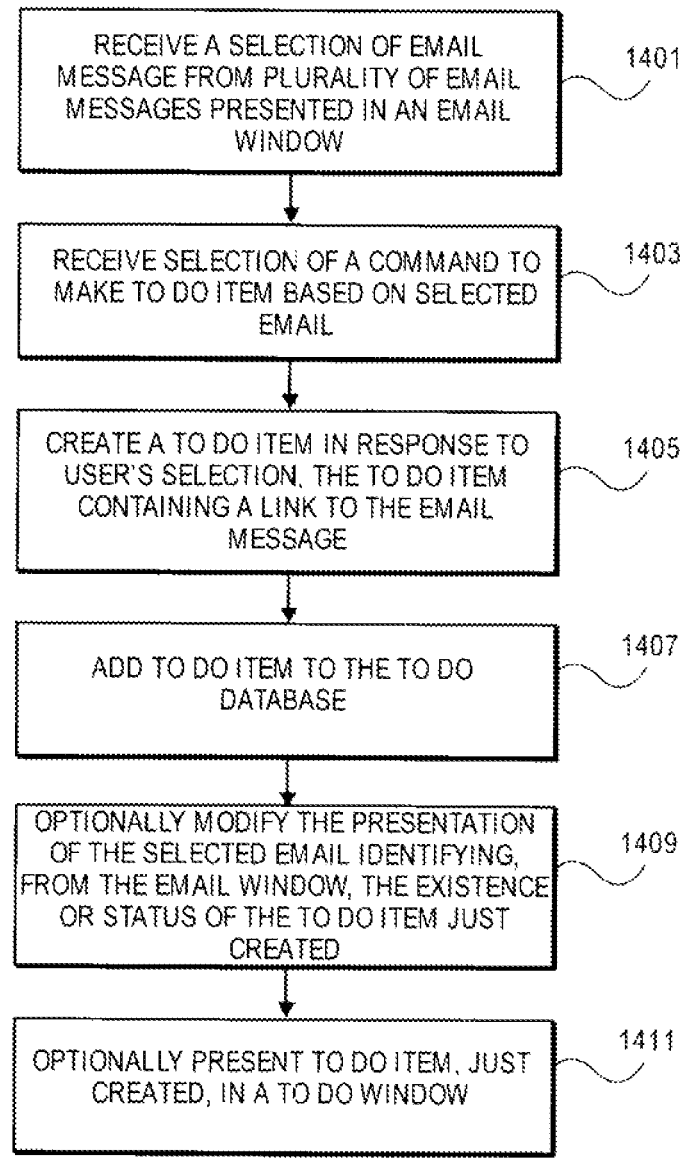
FIG. 14 is a flowchart illustrating an exemplary method according to certain aspects of the present inventions.

FIG. 14 shows an alternative method for creating To do items from an email. In this embodiment, a To do item is created from an email without a selection of text from content of the email. In this manner a To do item is created for a message rather than created in a note in a message. In operation 1401, the data processing system receives a selection of one or more emails from a plurality of emails, such as presented in view 404 of FIG. 4A, where received emails are shown as a list within email window 401. The selection may occur by a variety of different techniques known in the art, or elsewhere described herein. In operation 1403, the data processing system receives a selection of a command to make a To do item based on the selected email(s). The selection may occur by a variety of techniques common to the art, including a technique in which a user selects a command button, such as "To Do" button 401, and, at operation 1405, the data processing system creates the To Do item in response to the user's selection and adds the To do item to the To Do database at operation 1407. The To do item, just created, contains a link to the email selected at the time of receipt of the command to create the To do item, as discussed elsewhere herein. The to Do item created may further have a title field including at least one of text from the subject field of the email message and text from the body of the email message. In certain embodiments, when a more than one email is selected (i.e. a mass selection) from the plurality of emails, one To Do item is created for each email selected, each new To Do item having a link to a corresponding one of the emails included in the mass selection. In other embodiments, when a more than one email is selected (i.e. a mass selection) from the plurality of emails, a single note is automatically created and a plurality of To Do items is created, one for each email selected, is contained within the single note. the Optionally, in some embodiments at operation 1409, the presentation of the email from which the To do was created is modified to identify the selected email as being associated with the To do item just created. As a further option, the To do item just created may be presented in a "To Do" window at operation 1409 to provide the user a displayed command interface.

In an exemplary embodiment, the presentation of the email from which the To do was created, such as the presentation in view 404 of FIG. 4A, is modified to include a user modifiable badge, such as a "check box" to indicate the status of the To do as completed or not. The data processing system then dynamically edits the To do database as the check box state is edited by the user and the check box is edited dynamically by the data processing system in the email database as the To do item is edited by the user.

Figure 5:
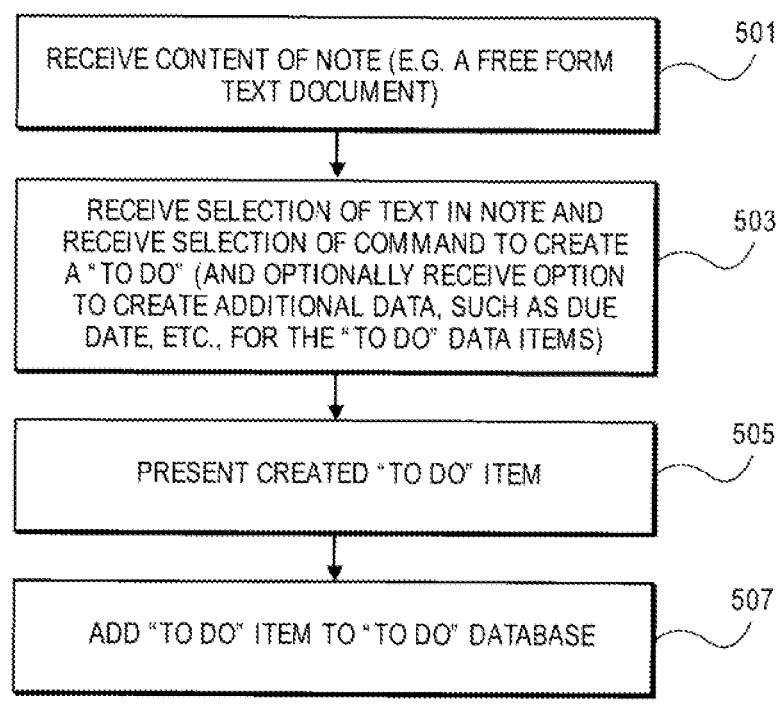
FIG. 5 is a flowchart showing an exemplary method according to certain aspects of the present invention.
Figure 6A:
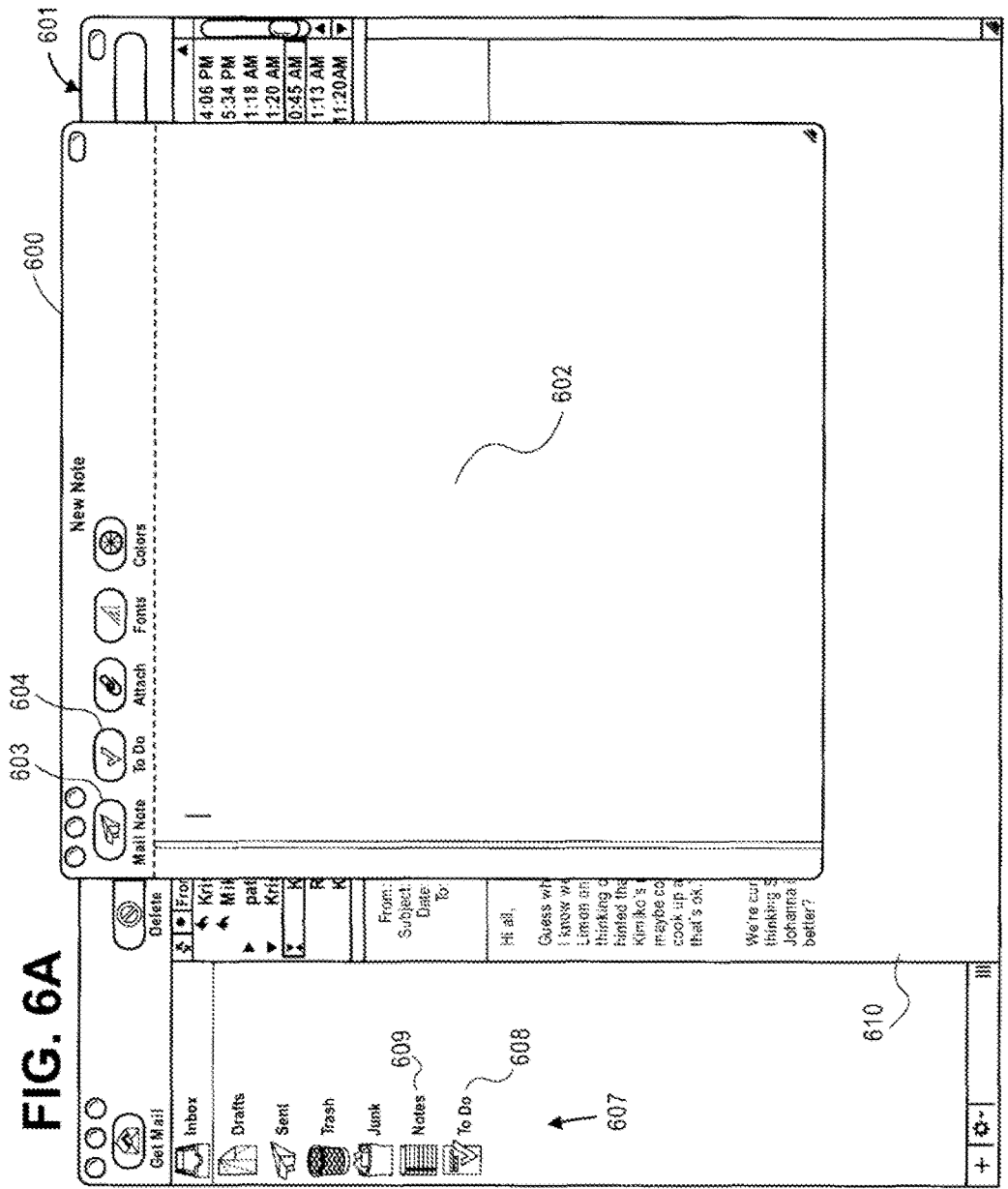
Figure 6B:
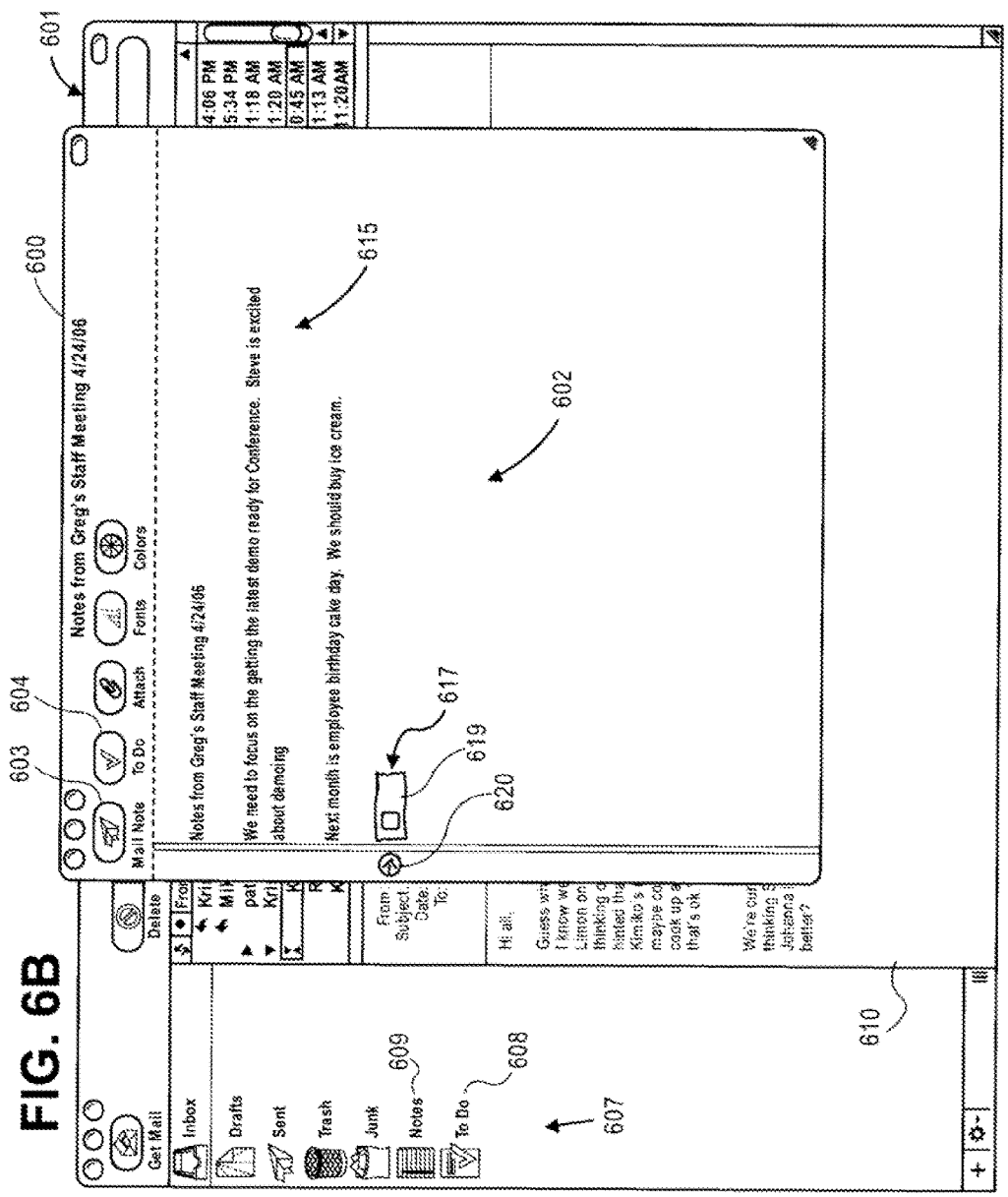
Figure 6C:
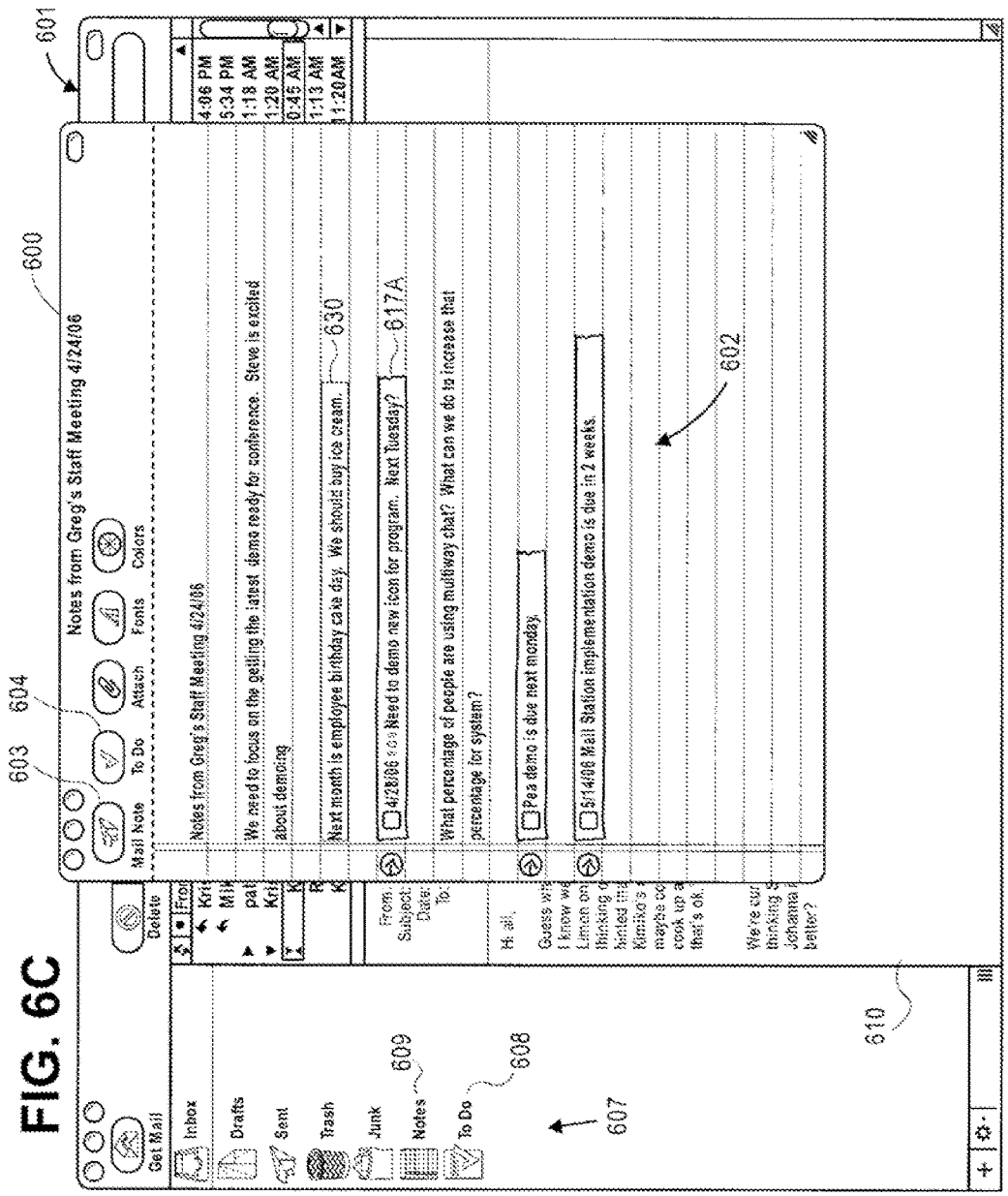
Figure 6D:
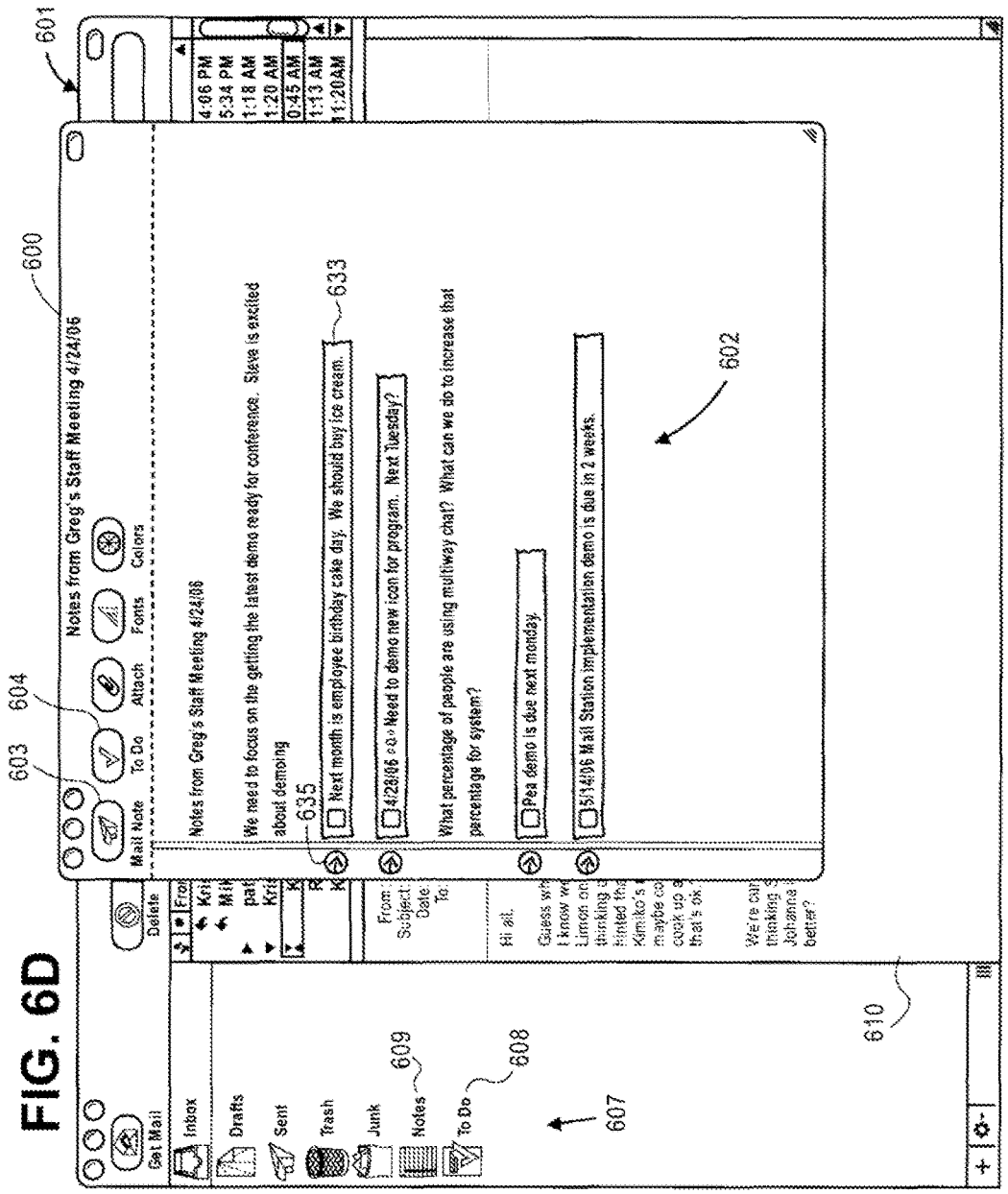
Figure 6F:
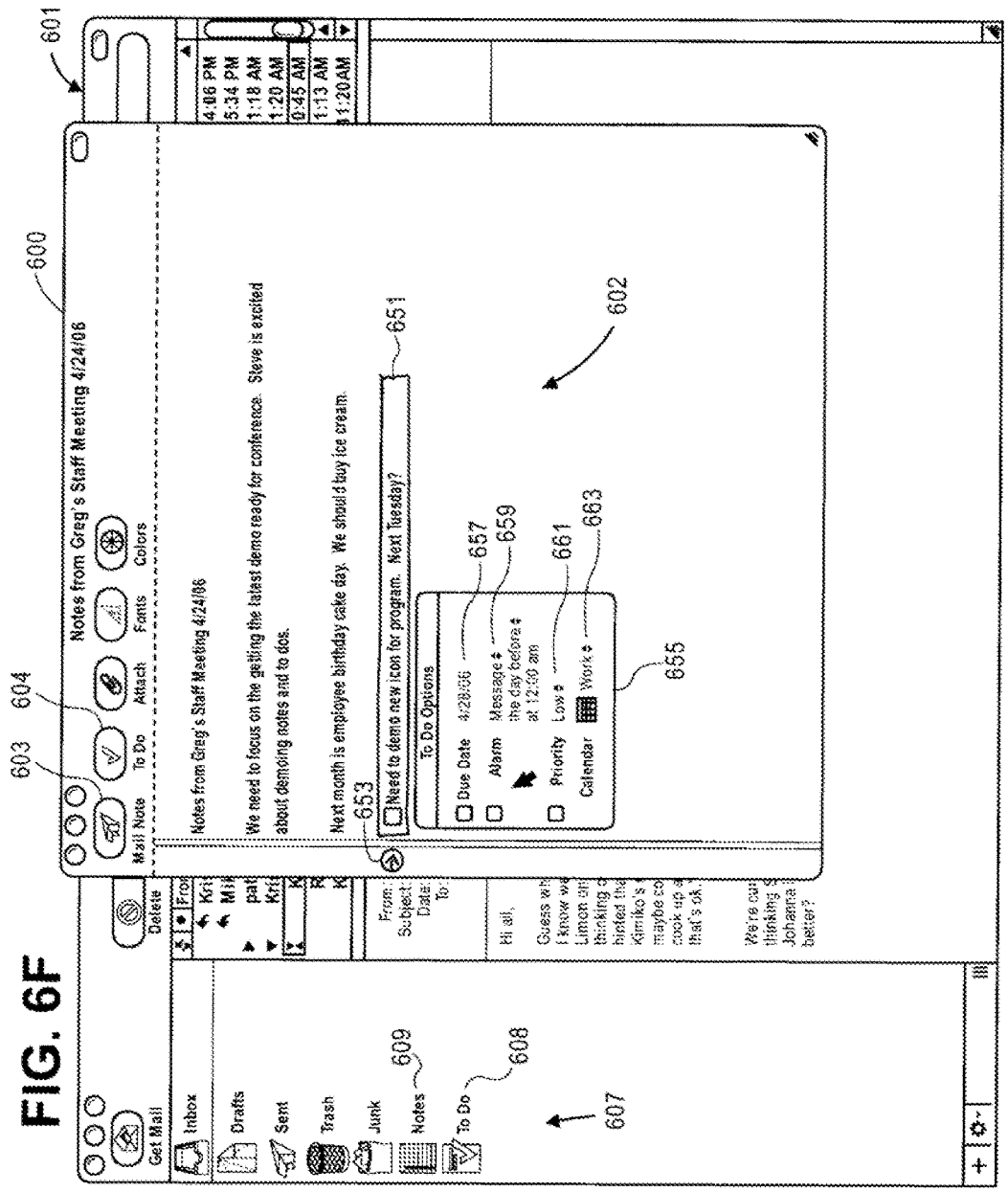

FIG. 5 shows, in flowchart form, another exemplary method according to another aspect of the inventions. In this exemplary method, a note or a portion of a note is used to create a new To do item. The note may be maintained, in certain embodiments, by the note manager 207 shown in FIG. 2 and may be maintained in the note database 203 and may be synchronized with the new To do item created as part of the method of FIG. 5; this synchronization has been described elsewhere herein. The new To do item may be maintained in the To do database 204 and is similarly synchronized, in at least certain implementations, with the To do item within the note used as part of the method of FIG. 5. The method of FIG. 5 may be used with the example of a user interface shown in FIGS. 6A, 6B, 6C, 6D, 6E, 6F, and 6G. In operation 501, the content of a note, which may be a freeform text document, is received. Note window 600 shown in FIG. 6A contains a body 602 of the note which can contain the text in freeform. The note window 600 may appear as a result of a "new note" command which may arise from the activation of a note button or new note button on a user interface or by the use of one or more keystrokes or other input. In operation 503, the data processing system receives a selection of text in the note and receives a selection of a command to create a To do item. The examples of the user interface shown in FIGS. 6C and 6D provide an example of how the data processing system can receive the selection of text in a note and then receive a selection of a command to create a To do item. In an alternative embodiment, the sequence of operations may be reversed such that the data processing system first receives the selection of a command to create the To do item and then receives the beginning and end of a selection of text and, upon receiving the end of the selection of text, creates the new To do item. Optionally, operation 503 may include receiving options to create additional data, such as due date, etc. for the To do data items. A user interface for inputting or creating this additional data is shown in FIGS. 6F and 6G. After creating the new To do item, the data processing system may present the newly created To do item in operation 505 and add, in operation 507, the new To do item to the To do database, such as the To do database 204 shown in FIG. 2. In at least certain implementations, there is no need to create an additional note or new note upon creation of the To do item because the note was used to create the To do item with the To do item in the note which may be maintained, in at least certain implementations, in the note database 203 shown in FIG. 2.

FIG. 6A shows an email window 601 and a note window 600 which overlaps the email window 601. The body 602 of the note window 600 is capable of receiving text entered by a user of the system. Further, the user can select the text or other information and create a new To do item as illustrated in the method of FIG. 5. The email window 601 includes a mailbox view area 607 and a To do collection button 608 and a notes collection button 609. The body of the email 610 is shown in the lower portion of the email window 601. The note window may have been created in response to a command from the user to create a new note as described elsewhere herein. The user may enter text, such as the entered text 615 shown in FIG. 6B, into the note window 600. Then the user may select the To do button 604 which may be used to create a new To do item. If no text has been previously selected when the To do button 604 is selected, then an empty To do item appears as the new To do 617 (with no text), and this new To do item includes a To do entry field 619 and a To do interface input control 620. FIGS. 6C and 6D show the reverse sequence in which text is first selected and then the To do button 604 is selected. The user or system may enter text into the To do entry field 619. The result of the entry of text into the To do entry field 619 is the To do item 617A shown in FIG. 6C. FIG. 6C also shows that the third paragraph in the note shown in note window 600 has been selected as indicated by the selected text 630. At this point, the user or the system may select the To do button 604 to create a new To do item from the selected text 630. The result of such a selection is shown in FIG. 6D in which a new To do item has been created as To do item 633 in response to the selection of the To do button 604. The To do item 633 includes a To do interface input control 635 which may be used to set options for the To do item 633.

The use of the To do interface input controls will be further described in connection with FIGS. 6E, 6F, and 6G. As shown in FIG. 6E, a To do item 651 includes a To do interface input control 653 which is selectable by the user to open or close a To do input panel 655 shown in both FIGS. 6F and 6G. The input panel is shown closed in FIG. 6E and open in FIGS. 6F and 6G. The To do input panel 655 includes a due date input 657, an alarm input 659, a priority input 661, and a calendar name input 663. The due date input 657 allows the user or the system to select a due date. In at least one implementation, the system may automatically select the due date according to the method shown in FIG. 9. The alarm input 659 allows the user or the system to set on or off an alarm for the To do item. The priority input 661 allows the user or the system to set a priority level for the To do item. The calendar name input 663 allows the user to select the particular calendar for the To do to be associated with. In at least one implementation, the calendar application program includes a list of selectable calendars for a particular user for views of different calendars or combinations of calendars concurrently. An example of such a calendar application program is described in published U.S. Patent Application No. 2004/0044646; for example, FIG. 3 of that published U.S. patent application shows two calendars for the same user, in this case a home calendar and a work calendar, each having events, and each of which have been selected to be shown on the same calendar view for a single user. Published U.S. Patent Application 2004/0044646 is hereby incorporated herein by reference. Hence, the calendar name input 663 allows a particular To do item to be associated with a particular one of a plurality of selectable user calendars.

The mail note button 603 shown in the note window 600 is a command which allows the user to cause the note to be converted into an email and sent to another user as an email. This will be further described below in connection with the method of FIG. 7 and in connection with the exemplary user interfaces shown in FIGS. 8A-8F.

Figure 7:
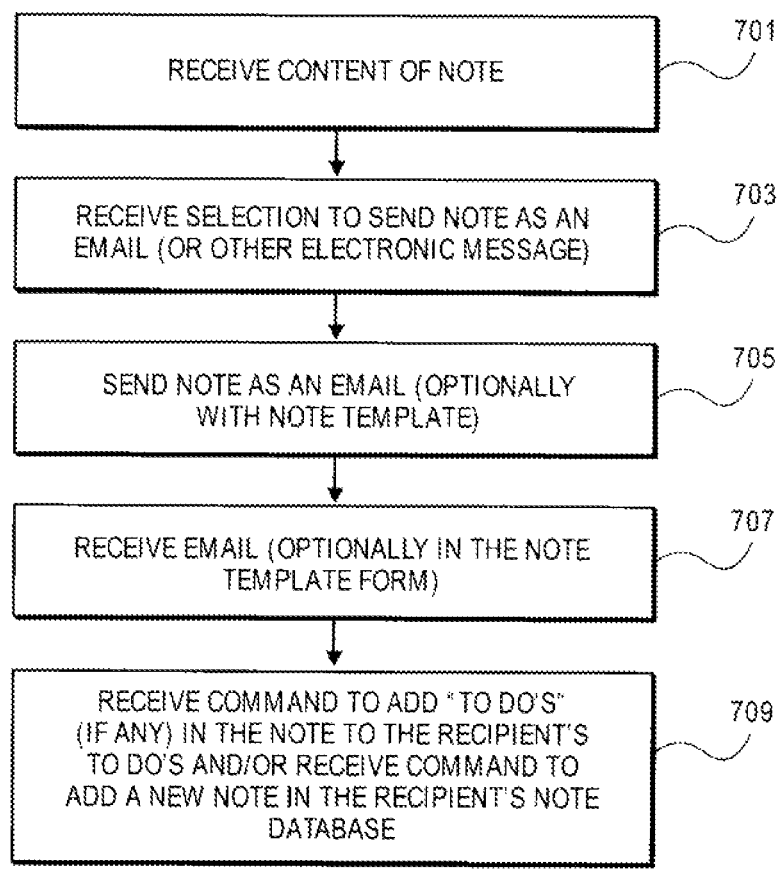
FIG. 7 is a flowchart illustrating an exemplary method according to certain aspects of the present inventions.

In operation 701 of FIG. 7, the data processing system receives content of a note. This may occur as a result of a user entering the content or the user merely retrieving the previously saved note. In operation 703, the data processing system receives a selection of a command to send the note as an email or other electronic message, such as instant messaging. In operation 705, the system sends the note as an email; optionally, the email may be sent with a template of the note, such as a template which resembles a yellow paper page with horizontal lines on the page as shown in FIG. 8D in the email body 833. In operation 707, another data processing system or the same data processing system receives the email, optionally in the note template format. Then in operation 709, the receiving data processing system receives a command to add the To do items, if any, in the note to the recipient's To do items, such as a To do database. Further, the recipient's data processing system may receive a command to add a new note in the recipient's note database. In certain implementations, the addition of the note occurs automatically when the To do's are imported from a note.

Figure 8A:
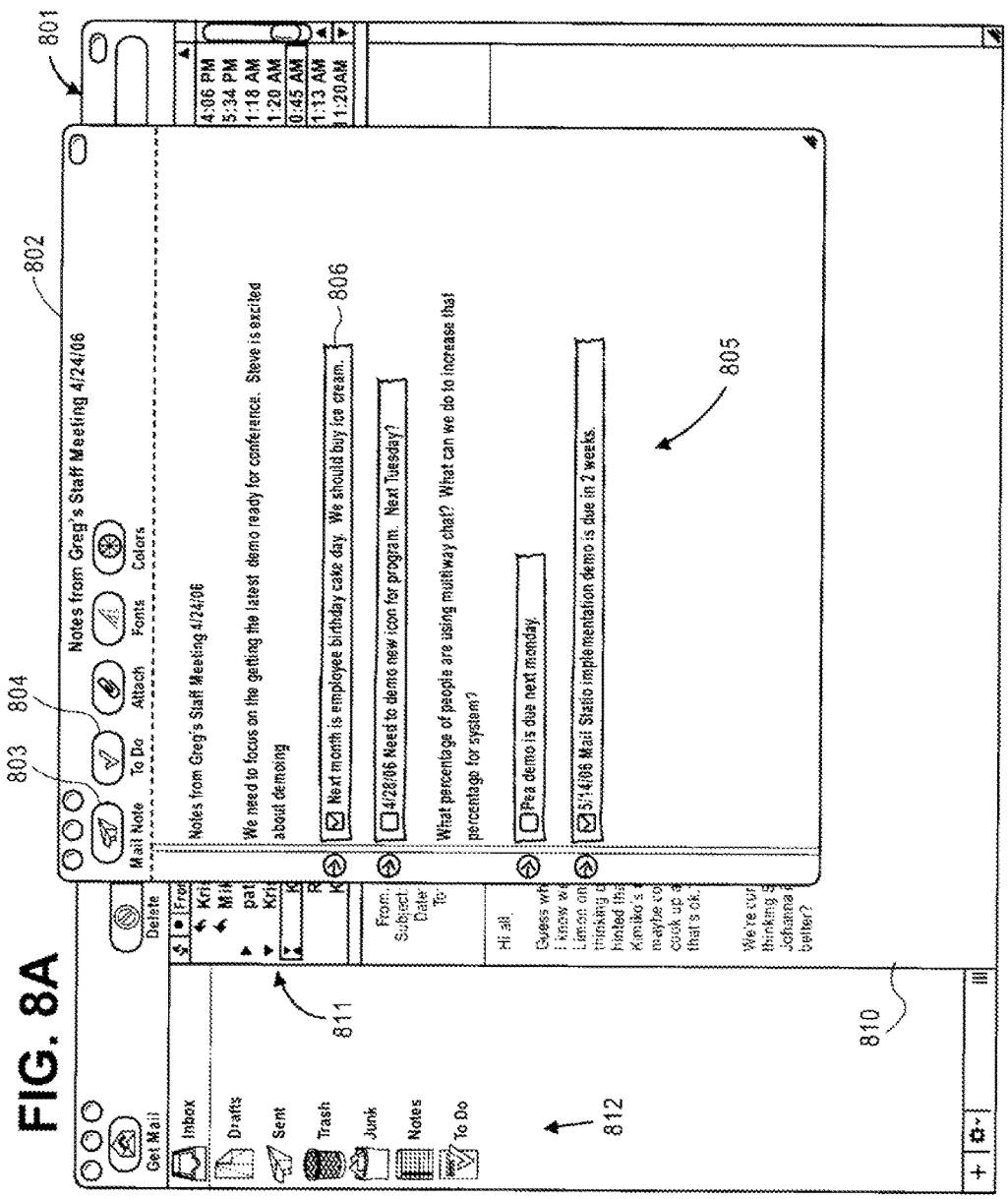
FIGS. 8A, 8B, 8C, and 8D show exemplary user interfaces which may be used to convert a note into an email and then to allow the recipient of the email to import To do's from the received email as well as to convert the received email into a note as shown in FIGS. 8E and 8F.
Figure 8B:
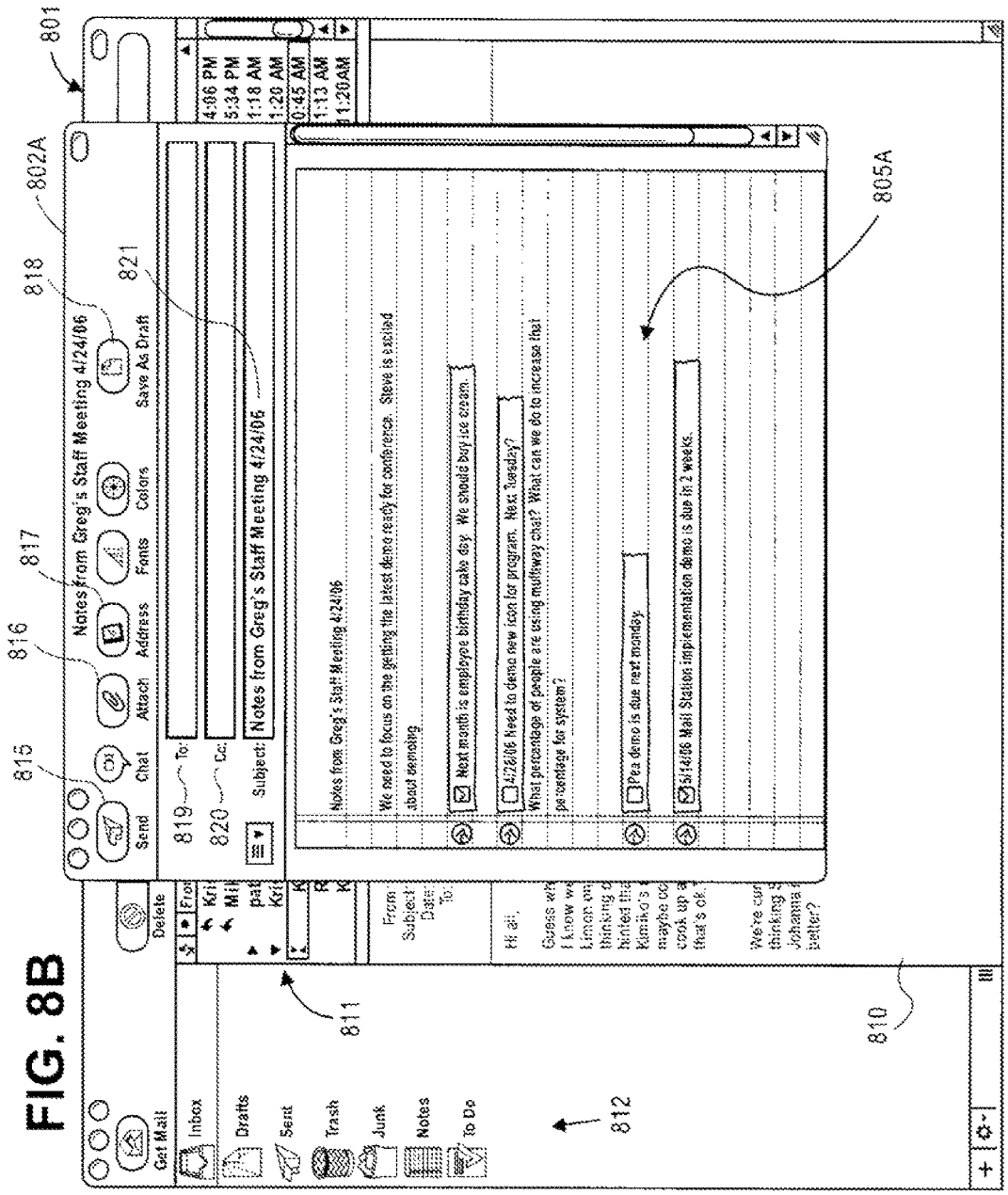
Figure 8C:
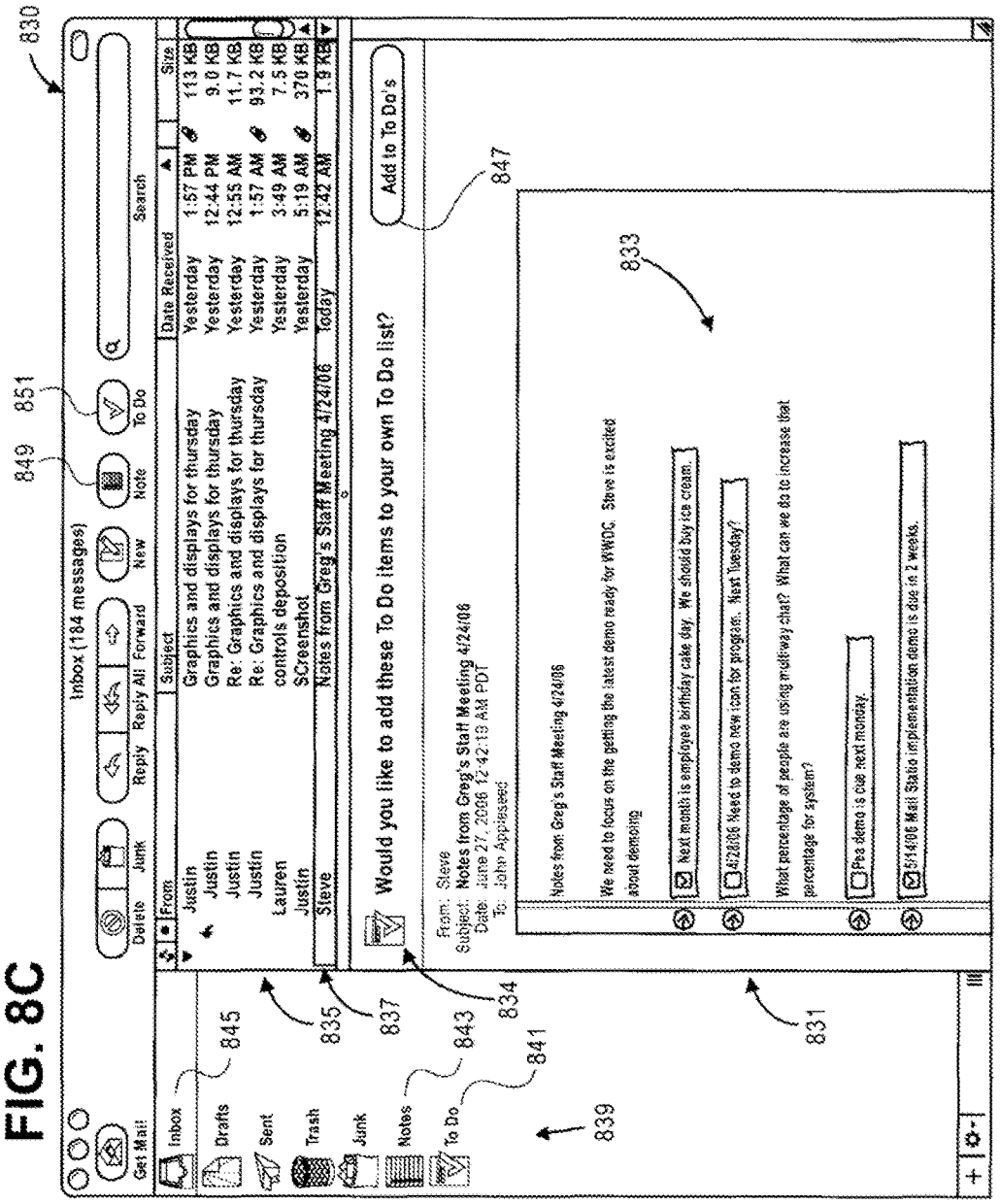

FIG. 8A shows an example of a note window 802 which includes a note body 805 having content entered into it. In addition, the note body 805 includes four To do items, including To do item 806. The note window 802 includes at least two user interface controls which are the mail note button 803 and the To do button 804. The To do button 804 is used by the user to create a To do, either before entering any text or after selecting text. The mail note button 803 may be used by a user to cause the note to be converted into an email and to send the email as further described herein. The email window 801 includes a body 810 of the email and also a mailbox view area 812 and a view 811 of received emails in the currently selected inbox as shown in FIG. 8A. If the mail note button 803 is selected or activated, this results in the creation of a new email shown in window 802A which represents the email of the note shown in FIG. 8A. In the interface shown in FIG. 8B, the email 802A has not yet been sent but can be sent by activation or selection of the send button 815. In addition, the user may attach an attachment to this email using the attach button 816. The email window 802A includes a "To" field 819, a "cc" field 820, and a "Subject" field 821. The email window also includes an address book button 817 to cause the appearance of an address book containing email addresses and other information, and a "save as draft" button 818 which allows the user to save the note as a draft. The note has been converted into an email but, in at least certain embodiments, it will remain as a separate note document within the note database 203 described above. The email itself will also be separately stored in an email database and the To do items within the note will be separately stored in the To do database 204 as described above. Further, as described herein, the To do items in the To do database are synchronized in a live manner with the corresponding To do items within any note containing those To do items. After the user has, or the system has, entered an email address or other address in the "To" field 819, the email may be sent by activating the "Send" button 815, which causes the email to be sent to the recipient or recipients. FIG. 8C shows an exemplary user interface of an email window 830 having received an email sent from the interface shown in FIG. 8B. The email window 830 includes an email pane 831 and a view 835 of received emails. The email body 833 is displayed within the email pane 831. The email body represents the content of the email 837 shown in the view 835 of the inbox 845. The inbox 845 is shown in the mailbox view area 839 which also includes the To do collection button 841 and the notes collection button 843. It can be seen that the template of the note which was sent was preserved within the email received by the recipient. In one exemplary embodiment, the note may appear to be a yellow piece of paper with horizontal lines having text written in registration with those horizontal lines as shown in FIG. 8C. Other types of templates for notes may be alternatively used. The recipient's data processing system can recognize that the notes contain To do items and, as a result, display the To do pane 834 which asks the user whether or not to add the To do items in the note which was received through the email to the user's own To do list. This can be achieved by the user or the system selecting the "add To do's" button 847 shown in the To do pane 834. The selection of the "add To do's" button 847 will cause the To do's from the email received in the note template in this embodiment to be added to the recipient's To do database, which may be a system wide To do database which is similar to the database 204 shown in FIG. 2. In fact, in certain embodiments, the recipient may have the similar software architecture shown in FIG. 2 in which two separate application programs, an email application program and a calendar application program, can separately access a To do database 204 having To do items synchronized with corresponding To do items in one or more notes in the note database 203. Further, other application programs on the recipient's data processing system may also be able to access the To do database and the corresponding To do items in those To do entries in the To do database 204. An exemplary user interface of the email window 830 after selection of the "add To do's" button 847 is shown in FIG. 8D, in which the four To do items from the body 833 have been displayed in the To do pane 861. In addition, the selection of the button 847 may also cause the creation of a new note containing those four To do items so that the note remains in the note database even if the email 837 is deleted. As noted elsewhere herein, the note containing these four To do items may be synchronized with the To do items themselves and maintained in a note database which references the corresponding To do items maintained in the To do database. Each To do item, such as To do item 863, includes a To do interface input control, such as To do interface input control 865 and a "done" check box input 871.

Figure 8E:
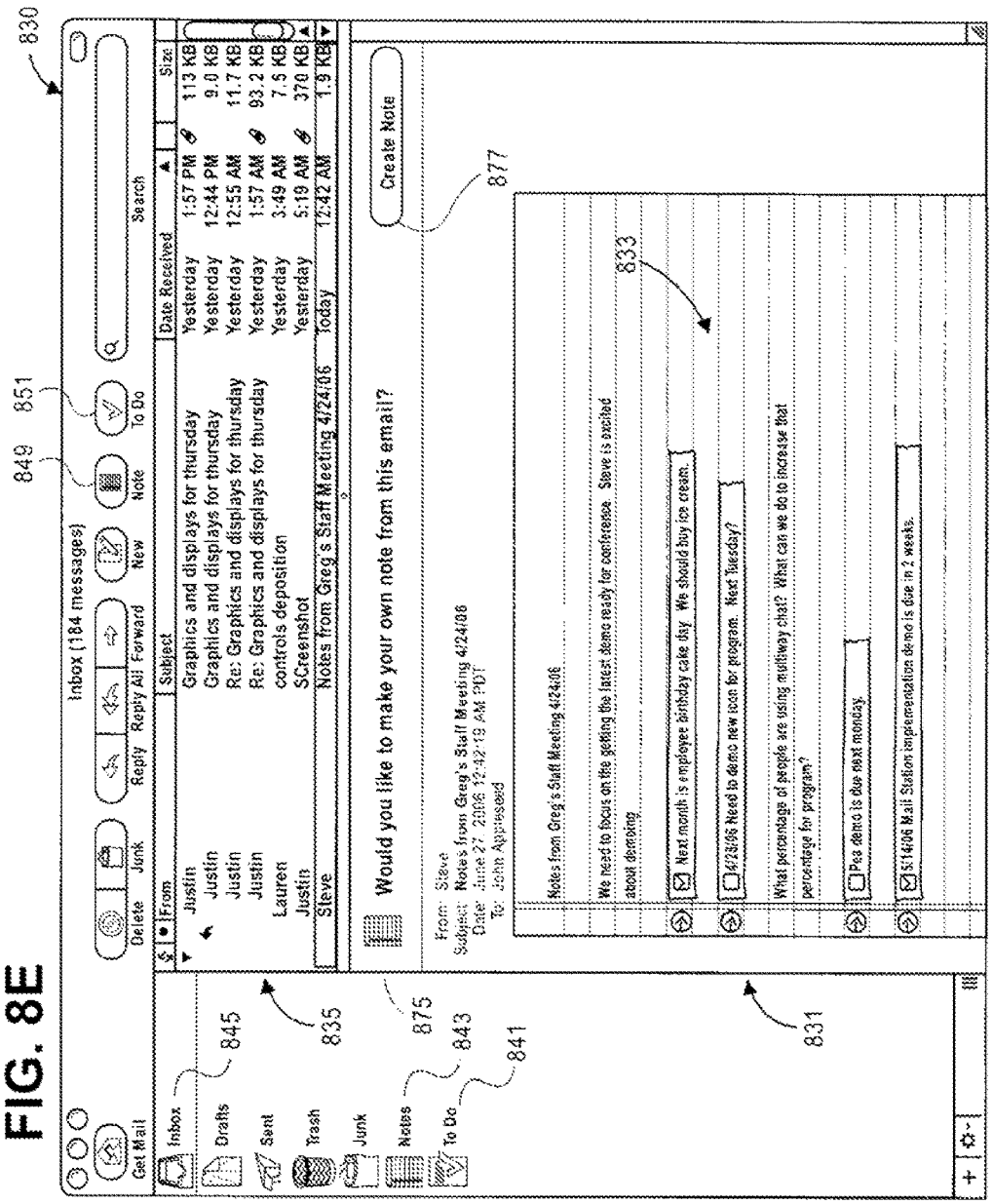
Figure 8F:
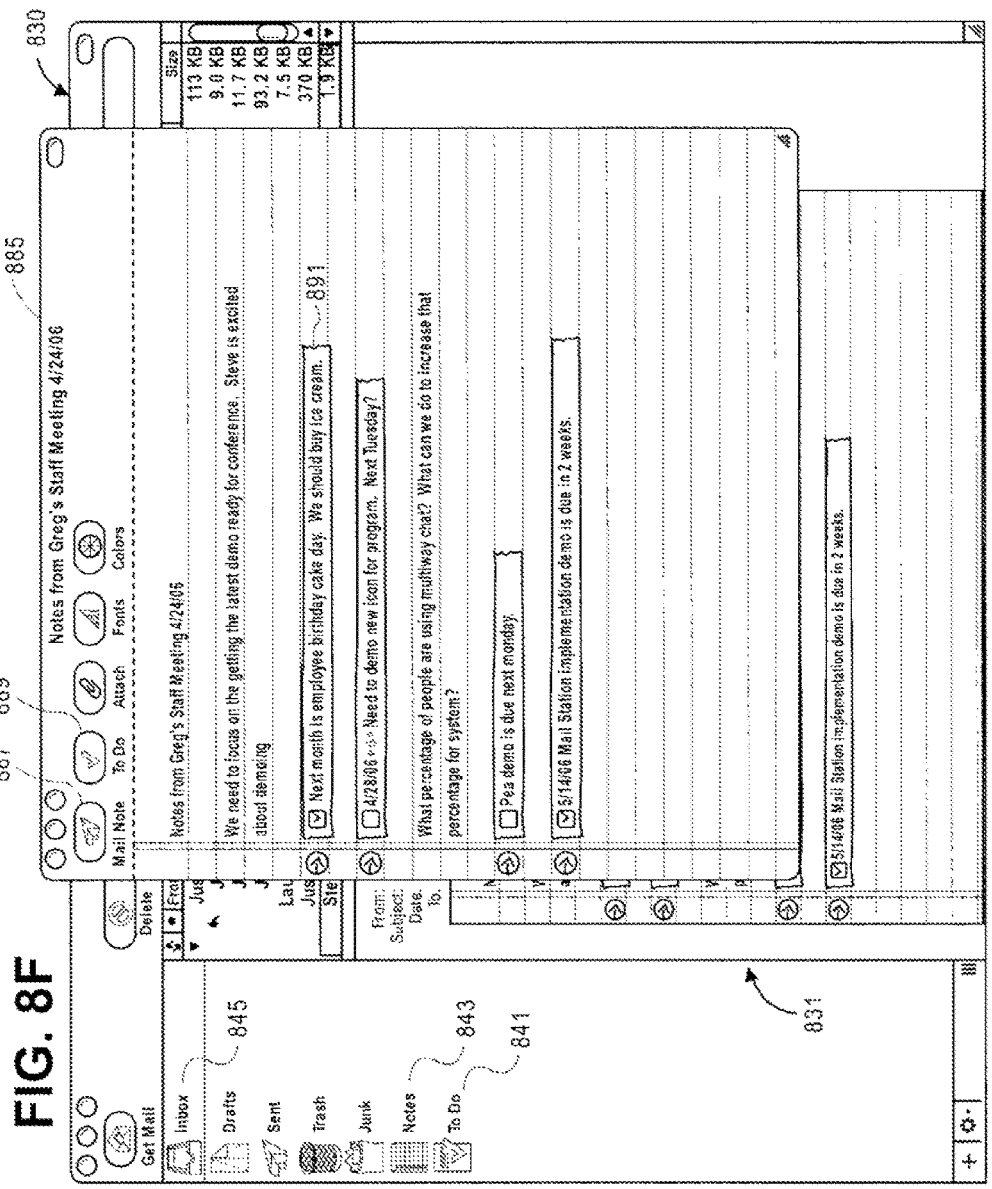

FIGS. 8E and 8F show an alternative embodiment in which a received email, in a note template format, can be turned into a note in response to a user selection on the recipient's data processing system. If the note contains To do items, those To do items are automatically, in at least certain embodiments, added as new To do items in the To do database, while the note, if imported, is added as a note in the note database, such as the note database shown in FIG. 2. In this embodiment, a note pane 875 asks the user whether the user would like to add the note from the email. If the user selects the "Create Note" button 877, then a new note is created as shown in FIG. 8F as note 885, which includes To do's from the note received as an email as shown in FIG. 8E. For example, the To do item 891 is shown in the note window 885 which includes the To do button 889 and a mail note button 887 which is similar to the corresponding buttons shown for note window 600 herein.

Figure 9:
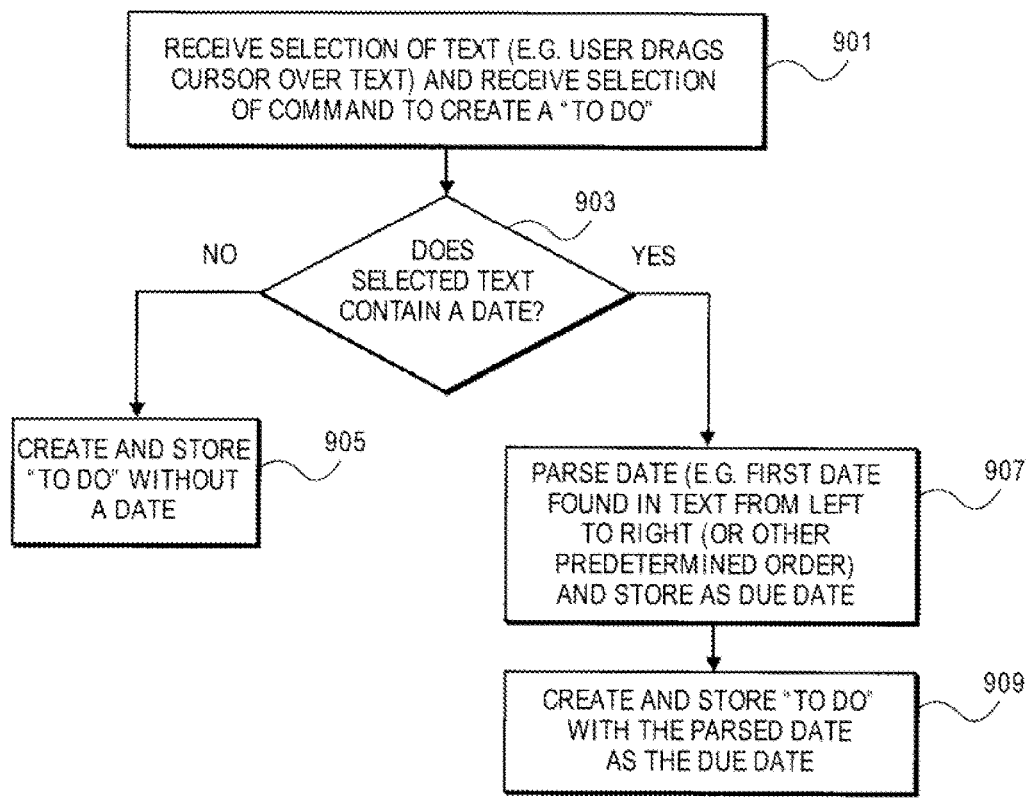
FIG. 9 shows a flowchart illustrating an exemplary method according to certain aspects of the present inventions.

As noted herein, the system may automatically determine a due date in the process of creating a To do. An example of this method is shown in FIG. 9. In operation 901, the data processing system receives a selection of text. For example, the user may drag a cursor across the desired text. The system may then receive a selection of a command to create a To do item. Alternatively, the sequence of operations may be reversed as noted above. In operation 903, the data processing system automatically determines whether the selected text contains a date. In certain implementations, the system may prompt the user with a dialog box containing a question asking the user to confirm that the date detected within the text is in fact the desired due date. In other embodiments, the system may select merely the first date and use that as a due date. If there is no date within the text, then the system diverts to operation 905 in which the To do item is created and stored without a due date. On the other hand, if the system determines that the selected text contains a date, then the system proceed to operation 907 in which the date is parsed from the selected text and stored as the due date. The system may select the first date found in text going in a predetermined order (e.g. from left to right) or the system may prompt the user to pick from one of multiple dates contained within the selected text or to abort the operation of attempting to determine a due date. After parsing the proper date, either with or without user input in operation 907, the data processing system creates and stores, in operation 909, a new To do item with the parsed date (with or without user input) as the due date for the new To do item.

Figure 10:
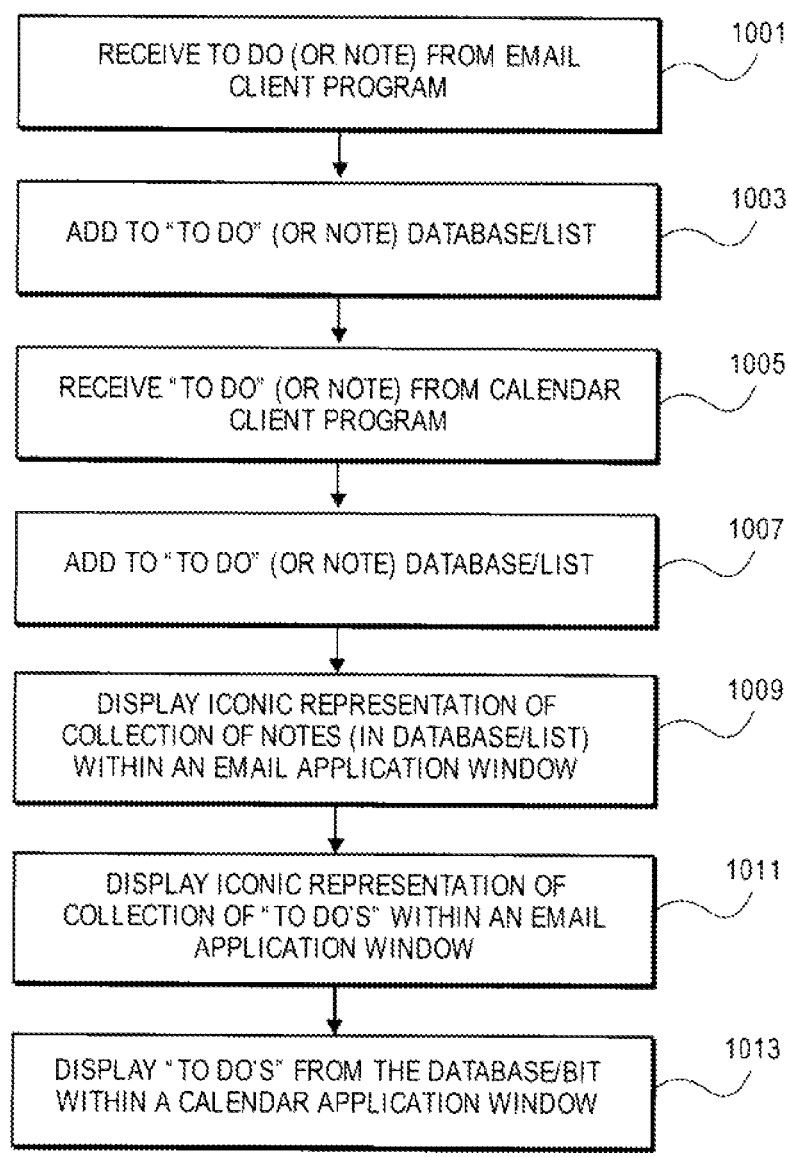
FIG. 10 is a flowchart illustrating an exemplary method according to certain aspects of the present inventions.

FIG. 10 shows an exemplary method of maintaining multiple databases such as those shown in FIG. 2. It will be appreciated that this is one example of a sequence of events and that other sequences in a different order with different elements are also possible. The databases referred to in FIG. 10 may be the same as the note database and the To do database shown in FIG. 2 or may be different databases. The method shown in FIG. 10 begins in operation 1001 in which the data processing system receives a To do item or a note item from an email client program. This item is, in operation 1003, added to the To do database or the note database depending on the type of item it was. If it was a note containing a To do item, then both the note gets added to a note database and the To do item gets added to a To do database as described above. Further, in at least certain embodiments, the To do items within the note are synchronized with the To do items in the To do database. In operation 1005, the data processing system receives a To do item from a calendar application program, such as the calendar application program 202 shown in FIG. 2. In response, in operation 1007, the data processing system adds this To do item to the To do database. The data processing system may, in operation 1009, display an iconic representation of a collection of notes, such as notes in the note database, within an email application window. An example of such an iconic representation is shown as the note collection button 409 shown in FIG. 4E. In operation 1011, the data processing system may display an iconic representation of a collection of To do items within an email application program, such as the To do collection button 408 shown in FIG. 4E. In operation 1013, the data processing system may display To do items from the To do database within a calendar application window.

Figure 11:
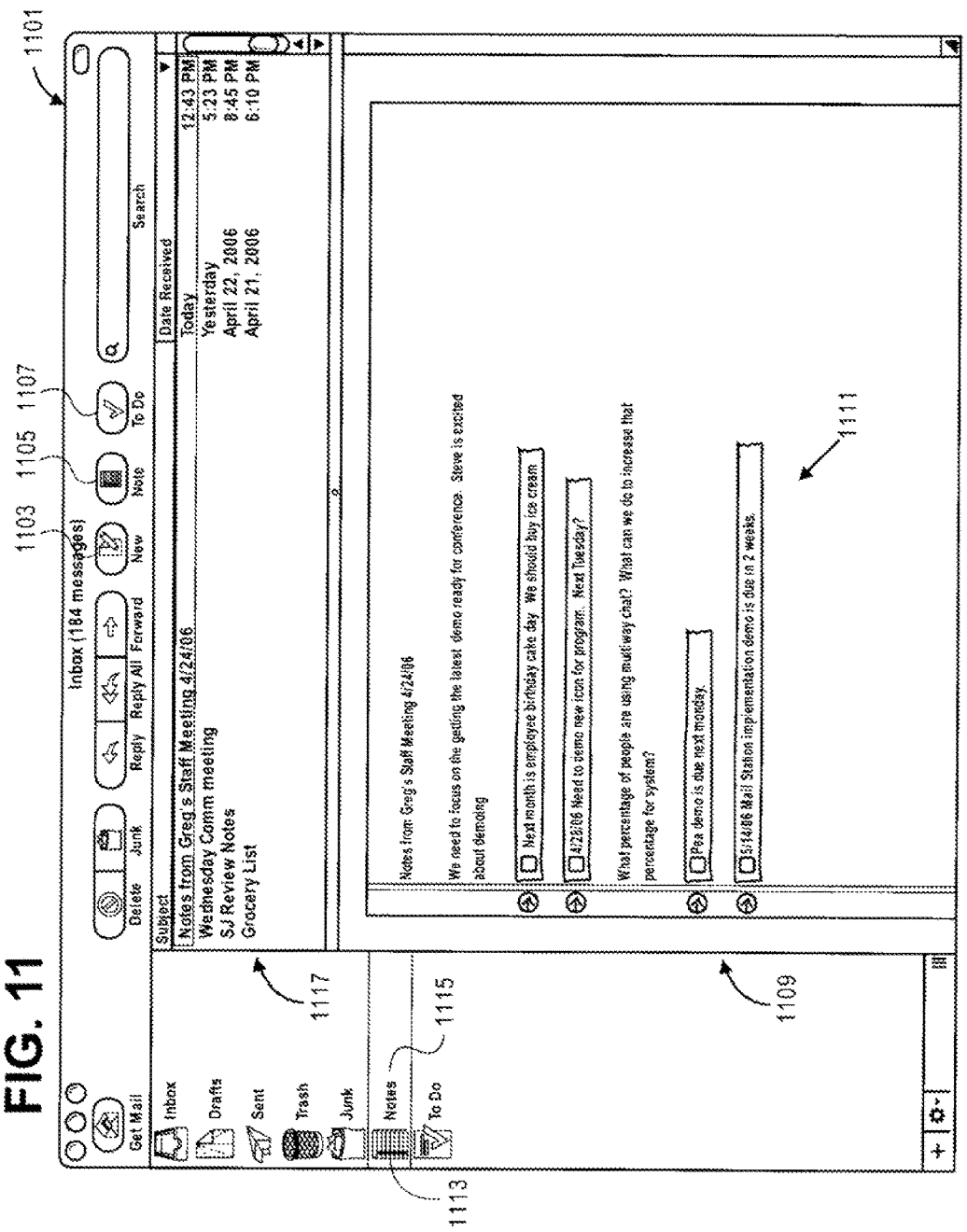
FIG. 11 shows an exemplary user interface for displaying notes within a note database to a user of a data processing system.

FIG. 11 shows a view of notes in a note view. The note pane 1109 includes the content 1111 of a note selected from the list shown in the view pane 1117. This view within notes window 1111 is obtained by selecting the notes collection button 1113 as indicated by the highlighting 1115. Each of the different notes may be viewed by selecting the appropriate note within the pane 1117. As further shown, the note content 1111 contains a note subject field displayed as a first line of the note. In an embodiment, as shown in FIG. 4C, this first line displaying the subject field of the note is not presented in the embedded view within a portion of the email window.

Figure 15:
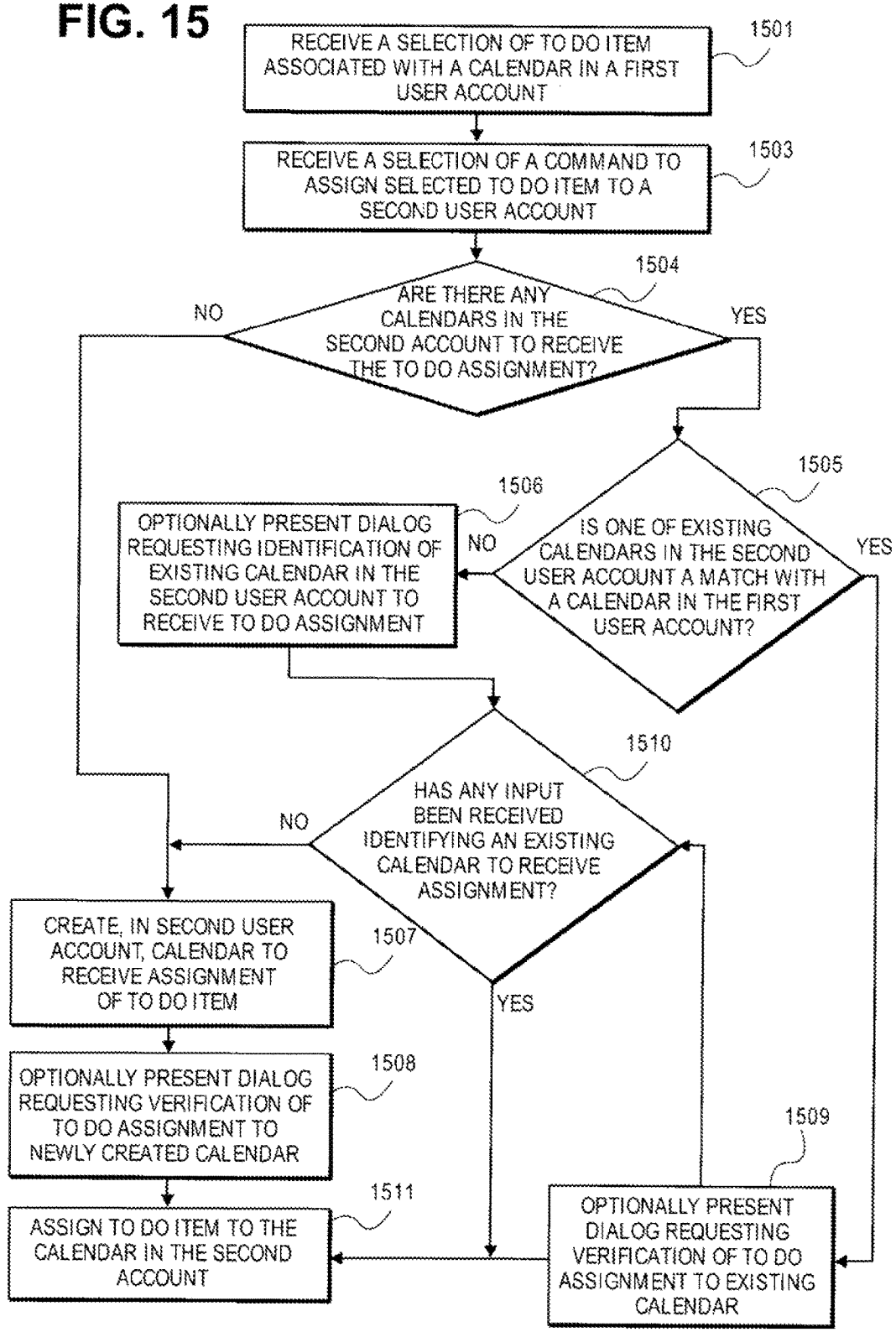
FIG. 15 is a flowchart illustrating an exemplary method according to certain aspects of the present inventions.

FIG. 15 shows an embodiment of a method whereby the data processing system may assign To do items associated with one or more calendars in a first user account to one or more calendars in a second user account. In certain embodiments, this method may be applied when a user selects certain To do items from a To do view, such as that shown in FIG. 4E. As previously described herein, each To do may be associated with a particular calendar. Where the calendar application program includes a list of selectable calendars for a particular user for views of different calendars or combinations of calendars concurrently, a user may have a plurality of calendar accounts. An example of such a calendar application program is described in published U.S. Patent Application No. 2004/0044646. Of the certain To do items selected from the To Do list, various calendars may be associated for a given user account.

In one embodiment, in operation 1501, a selection of a To Do item, a subset of To Do items or all To Do items, assigned to at least one calendar in a first user account is received by the data processing system. In operation 1503, the data processing system further receives a selection of a command to assign the selected To do item(s) to a second user account. The selection and assignment commands received at operations 1501 and 1503 may further be combined in the form of a "drag and drop" operation wherein To Do items associated with a calendar in one user account are selected with one click and then dragged to the second user account. At operation 1504, the data processing system determines if there are any calendars in the second user account to receive the To Do assignment. In an embodiment, if there are no calendars, then the data processing system automatically creates, at operation 1507, a corresponding calendar in the second user account to which a To Do item may be assigned. The data processing system creates a new calendar in the second user account to maintain the relationship between the To do item being assigned and the calendar of the first user account from which the To do item is being assigned. Thus, one or more calendars may be created at operation 1507, depending on whether the To do items selected at operation 1501 were associated to only one calendar in the first user account or a plurality of calendars. In a further embodiment, the data processing system may present a dialog requesting verification of the To do item assignment to the newly created calendar or calendars. The data processing system may further receive input with the dialog presented at operation 1508. Upon creating the new calendar, the data processing system then assigns the To do item selected to the newly created calendar, to display the To do items from the new calendar while retaining the links present in the To do items. Thus, even if To do items selected span a number of calendars in the first user account, the particular relationship between each To do and it's associated calendar are retained upon assignment to the new user account. In one particular embodiment, the data processing system creates in the second user account a copy of each calendar in first user account from which a To do item is being assigned and then assigns the selected To do item to the corresponding newly created calendar.

Depending on whether the user provides an input identifying a particular pre-existing calendar in the second user account which will receive the assignment of the To do, the data processing system either assigns the To do item(s) to the identified pre-existing calendar or first creates a new calendar in the second user account and then assigns the To do item(s) to the newly created calendar. In an exemplary embodiment, at operation 1504, the data processing system determines the second user account includes calendars, then at operation 1505, the system determines if one of those existing calendars is a match with a calendar in the first user account. In one embodiment, a match is determined on the basis of an existing calendar in the second user account having commonality with the calendar with which the To do item was associated in the first user account. The commonality may be between calendar names or another descriptive property of the calendars. In a further embodiment, where only one calendar exists in the second user account, that calendar is determined to be a match with a calendar in the first user account. With a match identified, the data processing system may automatically assign the To Do item to the calendar in the second account at operation 1511. In an alternative embodiment, at operation 1509, the data processing system may present a dialog requesting verification of the To do item assignment to the calendar or calendars in the second user account automatically selected as a match. The data processing system may further receive input with the dialog presented at operation 1509. In certain such embodiments where a dialog requesting verification of the default calendar selection, the input received identifies an existing calendar in the second user account to receive the assignment in operation 1511. This acknowledgement may be in a form common to the art, such as, but not limited to, selection of an "OK" button or key stroke entry upon presentation by the system of the default calendar selection. If no calendar is identified at operation 1510 (i.e. default selection is rejected), the system creates automatically, in the second user account a calendar to receive the To do item assignment, at operation 1507, as previously discussed.

If, instead, at operation 1505, the system is unable to find any matching calendar automatically in the second user account, the data processing system may automatically create, in the second user account, a calendar to receive the assignment of the To Do item at operation 1507. In an alternative embodiment, the system may optionally first present a dialog at operation 1506 requesting further identification of a particular pre-existing calendar in the second user account to receive the assignment of the To do item(s) selected in operation 1501. Upon, receiving such information at operation 1510, the system then so assigns the To Do item to the calendar in the second user account identified at operation 1511. If instead such identification is not received at operation 1510, the system proceeds to create a calendar in the second user account to receive the assignment of the To Do item at operation 1507, as previously described. In still another embodiment, the data processing system, at operation 1506, presents the user with a list of calendars existing in the second user account to which the To do item may be assigned by which the user may identify one or more particular calendar to receive the assignment of To do items associated with a particular calendar in the first user account. In one such embodiment, the user identifies, at operation 1510, the particular calendar by selecting or highlighting one or more calendars from the list using a selection method known in the art. Upon receiving the selection, the data processing system then assigns the To do item(s) from the first user account to the correspondingly identified calendars at operation 1511. In this manner, a To do item from any particular calendar in the first user account may be propagated to one or more calendars previously existing in the second user account to provide for live updating and synchronization of To do items across user accounts.

Thus, in an exemplary implementation, where the first user account is "Thesis Paper," with the calendars "school" and "home" and the second user account is "Job Search," having only a "home" calendar, at operation 1501, the data processing system receives a selection of To do items associated with both the school and home calendars in the Thesis Paper account. At operation 1503, the data processing system receives a command to assign the selected To do items to the Job Search account. In one embodiment, at operation 1511, the data processing system automatically assigns the To do items selected that are associated with the home calendar in the Thesis Paper account to the home calendar in the Job Search account identified as a match at operation 1505. In a further embodiment, before the assignment operation 1511, the data processing system first presents, at operation 1509, a dialog to the user requesting input to acknowledge the To do items from the home calendar in the Thesis Paper account to are to be assigned to the home calendar in the Job Search account and then, upon receiving such input at operation 1510, performs the assignment at operation 1511. However, because some To do items originally selected in the Thesis Paper account did not belong to the home calendar, merely automatically assigning all To do items selected to the existing home calendar in the Job Search account may disadvantageously mix To do items that had been deliberately associated across the two calendars, school and home, in the Thesis Paper account. In certain embodiments therefore, to avoid such a loss of association, the data processing system automatically creates, at operation 1507, a second calendar in the Job Search account to which the To do items associated with the school calendar in the Thesis Paper account are assigned. In one embodiment, where no input identifying a particular existing calendar has been received at operation 1510, the data processing system automatically creates a "school" calendar in the Job Search account and assigns, at operation 1511, the To do items associated with the school calendar in the newly created school calendar in the Thesis Paper account, thereby maintaining the original association. In a further embodiment the data processing system presents a dialog to the user request input of a new name for the automatically created calendar.

Figure 16:
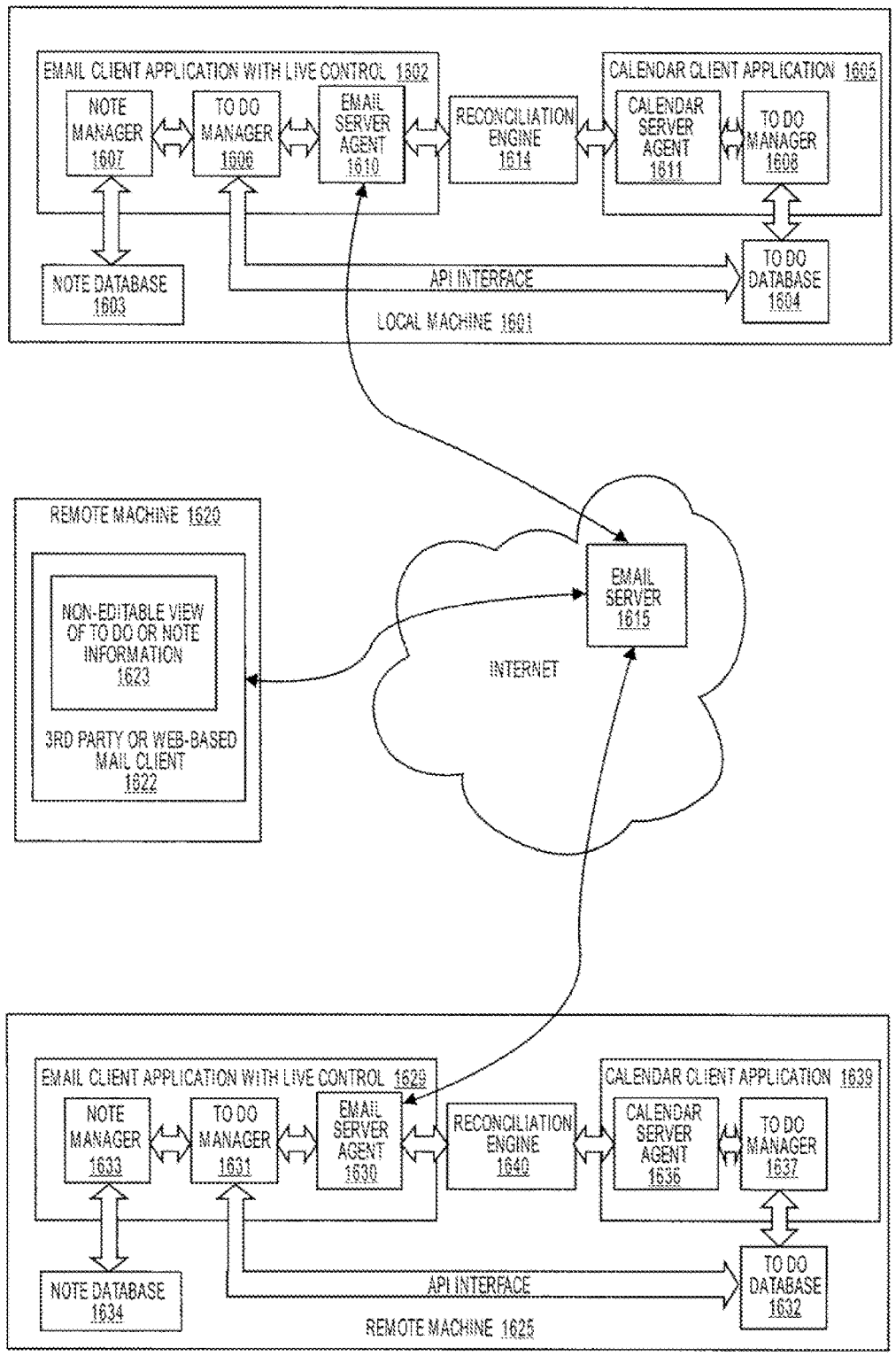
FIG. 16 shows an example of a software architecture having a system wide To do database and a note database on a local system which interacts with an remote IMAP electronic messaging application clients.

In particular embodiments, the architecture of the software or data structures shown in FIG. 16 allows the To do's within a note and To do items in the To do database to be actively synchronized between local and remote data processing systems via a remote server adhering to a message transport protocol. In certain embodiments, To do information is embedded as encoded metadata in an email message and pushed to and received from an email server, such as an IMAP server. Certain further embodiments may allow synchronization between multiple machines using multiple transport protocols, and other servers, such as a CalDAV server, may be used.

As depicted, local machine 1601, comprising a data processing system, such as described in FIG. 1, includes a local email client application 1602 having data structures, such as described in FIG. 2, to provide live controls to To Do items and notes. Specifically, local email client application 1602 includes To do manager 1606 linked with the note manager 1607 to allow notes stored in note database 1603 to be synchronized in a live manner with To do items stored in To do database 1604 such that a change being entered in an editable text document, such as a note, will be reflected in the corresponding text of the To do item, such as a calendar viewable from calendar client application 1605, having To do manager 1608, also linked to To do database 1604, as previously discussed herein.

In particular embodiments, local email client application 1602 further includes email server agent 1610 to communicate, with email server 1615, embedded metadata in a text editing document (i.e. an email message) hidden from the user. Thus, local email client application 1602 never presents the text editing document containing the metadata to a user as a viewable email message and operates on the metadata in a manner transparent to the user. Email server 1615 may be communicated to via the Internet, as commonly known in the art. In a certain embodiments, email server agent 1610 pushes a "false" message to email server 1615 upon the occurrence of particular events occurring on local machine 1601, such as a modification of the To do database 1604 or note database 1603. As defined herein, a "false" message is a message communicated via a messaging protocol between a local machine and a message server, the message containing metadata describing an object that is acted on by the local machine without presenting the message to the user. The message is false in that is not ordinarily presented to the user as an incoming or outgoing message but instead is operated on by the system to modify a system object. In certain exemplary embodiments, the object communicated, is a database record, such as a To Do item. In some embodiments, email server agent 1610 pushes a "false" message to email server 1615 only upon particular (not all) modifications to the To do database 1604, such as only upon a change to a To Do having a relatively immediate calendared date. For example, false messages relating only to those To Do items scheduled to be done within the next 24 hours may be pushed to the mail server by email server agent 1610. In other embodiments, false message containing a batch of To Do item changes, such as those occurring over a fixed time, is sent periodically. In at least one embodiment, however, a false message is pushed upon every modification of the To do database 1604 or note database 1603.

In certain embodiments of the present method, upon the occurrence of a triggering event on local machine 1601, the false message pushed by email server agent 1610 contains information of the event or resulting object in a format such as, but not limited to, ASCII text, Multipurpose Internet Mail Extensions (MIME), and other commonly known standards. In a further embodiment, the false message may contain information structured in more than one manner, such as an ASCII version and a MIME version. Alternatively, a plurality of false messages, each of the plurality containing information having a different format may be pushed to the email server 1615 upon each event. Thus, in an exemplary implementation, upon an update to the To do database 1604 (e.g. a change in a To Do item), email server agent 1610 encodes the To do record information into metadata and pushes a false message containing the metadata of the To Do database record in a format, such as MIME, to email server 1615. In particular embodiments, the message push is performed automatically, without involving the user. In certain further embodiments, email server agent 1610 also polls email server 1615 for new "false" messages and decodes the record information, such as To do database records. Just as with the message push, the polling process may adhere to any commonly known messaging protocol, such as IMAP. Thus, email server agent 1610 may poll email server 1615 for "false" messages indicating a record on the email server has been deleted to identify a local database record that is to be deleted from local machine 1601, or for false messages indication a record on the email server has been added or updated.

In further communication with email server 1615 may be remote machine 1620 providing a third party or web-based email client 1622 to provide a non-editable view of the record or event information, such as To Do or note record metadata originating from local email client application 1602.

Additionally, remote machine 1625, including an email client application 1629, providing live To Do and note controls may also be in communication with email server 1615 to receive the record or event information, such as To Do and/or note updates, originating from local email client application 1602. In certain embodiments, similar to local machine 1601, remote machine 1625 provides live To Do and note controls by employing software architecture such as described in FIG. 2. In one such embodiment, remote machine 1625 includes email client 1629 including a mail server agent 1630, To do manager 1631, To do database 1632, note manager 1633, as well as note database 1634. In a further embodiment, remote machine 1625 also includes calendar client application 1635 including calendar server agent 1636 and To do manager 1637. Therefore, both local machine 1601 and remote machine 1625 include software with an architecture capable of pushing false messages to email server 1615 and polling email server 1615 for false messages generated as a result of activity on the database of the email server 1615. Such activity may further be the result of local machine 1601 or remote machine 1625 making changes to a database object, such as a To do item.

In embodiments where email server 1615 adheres to a standard messaging protocol, a transactional framework capable of preventing duplicate record information may be lacking or inadequate. In other words, email server 1615 may behave as an incoherent database server because object updates, such as adding and deleting, are not atomic operations. Without an adequate reconciliation process, cycling of events or objects can occur between the client machine and the email server providing the remote database. Therefore, in certain embodiments, local machine 1601 further includes reconciliation engine 1614. Reconciliation engine 1614 communicates with both email server agent 1610 and calendar server agent 1611. The reconciliation engine may run a reconciliation each time new records are received from the email server or from the local database server. In a particular embodiment, the reconciliation engine runs on a background thread on local machine 1601. Similarly, remote machine 1625 may further include reconciliation engine 1615 to enable encoded synchronization of information local machine 1601 and remote machine 1625 by way of false messages sent to a from machines 1601, 1625 and message server 1615. Because the false messages are not presented by the data processing system as messages, but instead are operated on with live database controls available to machine 1601 and 1625, the synchronization of database objects, such as To do items, is transparent to the user of machines 1601 or 1625.

Figure 17:
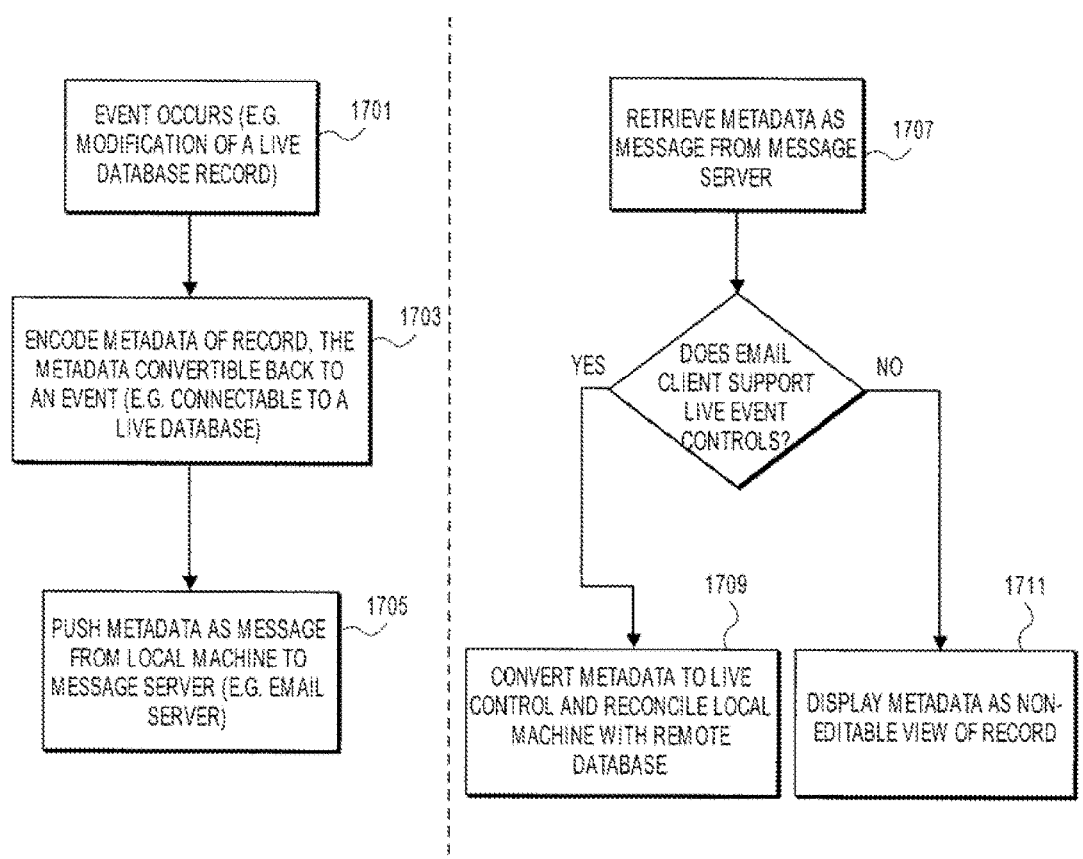
FIG. 17 is a flowchart illustrating an exemplary method according to certain aspects of the present inventions.

FIG. 17 depicts an embodiment of a method by which messaging protocol is used to view and/or reconcile a remote and local machine. At operation 1701, an event, such as a modification of a To do item, occurs on a local data processing system, such as local machine 1601, as discussed previously herein. At operation 1703, the data processing system encodes metadata as a "frozen version" of the modified record. In a particular embodiment, the metadata is generated so as to be convertible, or "thawed," by a client supporting live record controls, such as remote machine 1620, back into an corresponding record, such as a live To do item, which may then be acted upon by the remote machine. In an exemplary embodiment, the metadata is further generated so as to also be displayable as a non-editable view of the To Do or note information by an email client not supporting live To Do or note controls. At operation 1705 the generated metadata is pushed, as a false message, from the local data processing system to a message server, such as email server 1615.

At operation 1707, metadata is received as a message, such as by remote machine 1620, from a message server. Depending on the capabilities of the remote machine, the metadata may be "thawed" or converted, at operation 1709, back to a database record, such as a To do item, or the meta data file may be displayed, at operation 1711, as a non-editable view of the record metadata. At operation 1711, a remote machine incapable of supporting live To do or note controls, such as remote machine 1620, displays a view of the metadata as a non-editable view of the record information as an email message, as further shown in FIG. 18.

Figure 18:
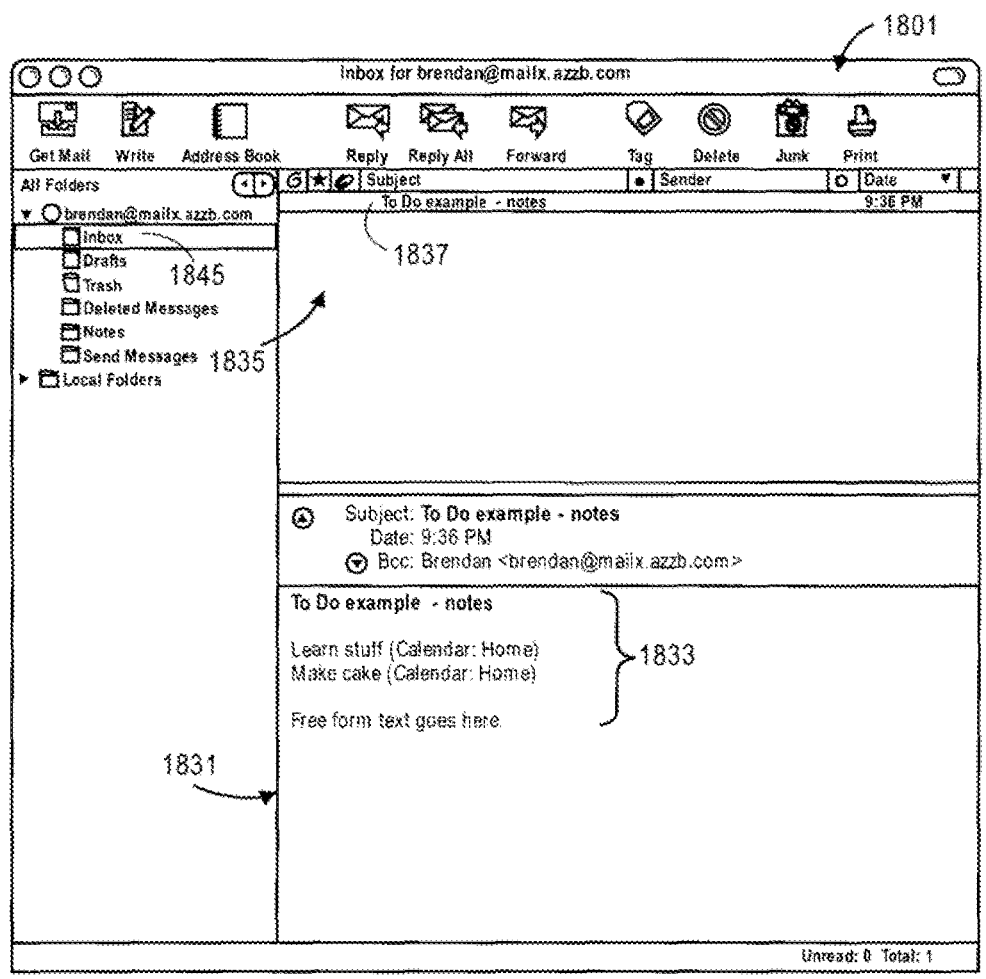
FIG. 18 shows an exemplary user interface which may be provided by a web-based IMAP client according to certain aspects of the present inventions.

In FIG. 18, an email window 1801 contains an email pane 1831 and a view 1835 of received emails. The email body 1833 is displayed within the email pane 1831. The email body represents the content of the email 1837 shown in the view 1835 of the inbox 1845. The email body 1833 displays the metadata generated at operation 1703 as a frozen version of To do items 1314 and 1340 as well as free form text 1355 as contents of the note created in FIG. 13B. Thus, the frozen version provides a textual and/or graphical representations of the event information as a newly received email on the message server. In this manner even remote machines including email clients which do not have the data structures to support live record controls, such as To do or note controls, may relay timely record information available on the message server.

In a further embodiment, upon the conversion of the metadata to a database record, operation 1709 may include reconciling data structures on the local machine 1601 with a database on the remote message server. In one embodiment, the local machine maintains a local database. In another embodiment, local machine maintains a local cache of the database on the message server, such as a local cache representing the state of a calendar server in calendar client application 1605 and any user initiated changes made from local machine 1601. Thus, upon the conversion of the metadata to a database record (e.g. To do item), operation 1709 may include reconciliation of the local cache on machine 1601 with the database maintained on email server 1615.

Figure 19:
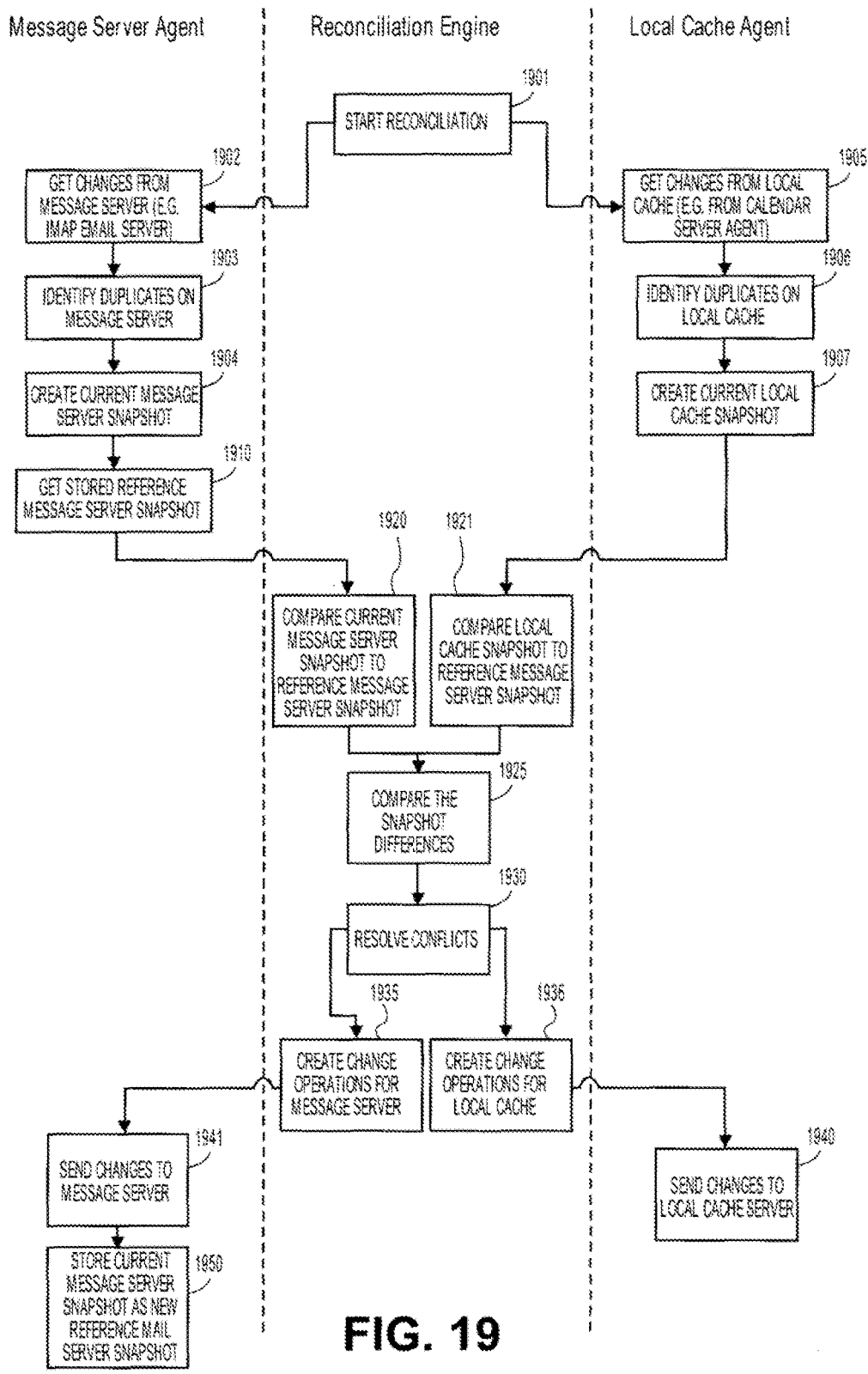
FIG. 19 is a flowchart illustrating an exemplary method according to certain aspects of the present inventions.

In one embodiment, the reconciliation process may be described as a three-way comparison between 1) a current "snapshot" of the message server, 2) a current "snapshot" of the local cache and 3) a reference "snapshot," which is a common ancestor of both the current message server snapshot and current local cache snapshot. FIG. 19 depicts an exemplary embodiment of a particular reconciliation method employed for a To do database. It should be appreciated that other databases containing other database objects may be similarly reconciled, such as for notes and email drafts. As shown, the reconciliation engine begins the method at operation 1901, at operation 1902, a message server agent, such as email server agent 1610, gets new "false" messages from the message server, such as email server 1615. Each message has a universally unique Message ID number. At operation 1903, duplicate messages on the message server are identified by messages having different Message ID numbers but common database object ID numbers. In an exemplary embodiment, the message with the higher Message ID number is kept and all others are added to a delete list to generate a good state for a snapshot of current email server state created at operation 1904. In a further embodiment, a dialog is presented to the user to receive input to resolve a conflict of greater complexity prior to the capturing the email server state. A snapshot of the current local cache is then created. In one embodiment, at operation 1905, the reconciliation engine gets changes to the local cache from the local cache agent, such as calendar server agent 1611. A good local state is created by eliminating duplicates at operation 1906, in a manner similar to that previously described for the email server agent, or by an alternate means commonly known in the art. Finally at operation 1907, a current snapshot of a local cache of the database is created.

At operation 1910, a reference message server snapshot is retrieved by the message server agent. At operations 1920 and 1921, the reference message server state snapshot is compared to the snapshot of the current message server snapshot and the reference message server snapshot is compared to the current local cache snapshot, respectively. A "snapshot" is a list of paired database record identifiers, each pair containing a universally unique database record ID and a message ID for that record stored on the message server. In one embodiment, this first snapshot comparison identifies 1) all database object (e.g. To Do item) ID numbers that occur in both snapshots, 2) those that occur in only the current snapshot and 3) those that occur in only the reference snapshot. The snapshot comparison then classifies, based on Message ID values, changes to database objects, as shown in FIG. 20. As shown, dashes in both the reference snapshot and current snapshot indicate no database object ID existed in either snapshot (and therefore there is no Message ID). Thus, the difference is classified as "no difference." A stagnant Message ID between snapshots is similarly classified as "no difference." A database object occurring in only the current snapshot has a current Message ID but none in the reference snapshot and is classified as "add." A "delete" difference is classified in a complementary manner if the database object occurring in only the reference snapshot has a current Message ID but none in the current snapshot. An incremented Message ID referring to the same database object ID in the reference snapshot and current snapshot generally indicates a more recent database object, so the difference is classified as "update." Finally, a decrement in message ID may also occur after a message server update, therefore the difference is also classified as "update."

The reconciliation method depicted in FIG. 19 proceeds with a comparison of message server snapshot differences and local cache snapshot differences at operation 1925 to identify modifications to database objects and reconcile the local cache and message server database. In one exemplary embodiment, the decision table depicted in FIG. 21 may be applied at operation 1925. As shown, where no difference has been identified in both the message server and local cache, no further action is taken with respect to that database object. Certain conflicts may occur during the comparison of snapshots at operation 1925, which are resolved by the data processing system at operation 1930. For example, where an "add" difference is identified in the message server comparison while and an "add" is identified in the local cache comparison, a conflict exists. In one embodiment, such a conflict is resolved by determining if the database objects between the two are equivalent, in which case the conflict and the database object is ignored. If the two database objects are not equivalent, then the data processing system presents a dialog to receive input from a user identifying which database object is to be retained. In a further embodiment, where an "updated" difference is identified in the message server comparison and a "delete" is identified in the local cache comparison, or visa versa, the conflict is resolved by favoring the update. As shown by dashed lines in the reconciliation engine decision column of FIG. 21, certain conflicts are avoided because the differences are generated using the common reference snapshot. In addition to resolving conflicts, the reconciliation engine determines change operations for both the message server and the local cache server at operations 1935 and 1936, respectively. For example, where no difference has occurred on the message server but and a difference classified as an "add" has occurred on the local cache, the reconciliation engine determines that database object must be added to the message server. Thus, in a particular embodiment, a To do item is created on local machine 1601 and the reconciliation method would determine the newly created To do item must be added to the message server and a false message must be sent to update the message server (email server 1615). At operation 1941, the message server agent sends the changes to the message server, such as email server 1615. Similarly, at operation 1940, the local cache agent then sends the changes to the local cache server, such as To Do manager 1608. Thus, in an exemplary embodiment, as shown in FIG. 21, where there is no message server snapshot difference, but there is a local cache snapshot difference, the message server may be refreshed upon the message server agent pushing a message, such described for operations 1701, 1703, and 1705, which contains metadata to "add," "delete," or "update" a database object, such as a To do item. To complete one reconciliation cycle, the message server agent stores the current mail server snapshot, at operation 1950, as the new reference snapshot and the reconciliation process may begin again.

Thus, in a particular embodiment, the message server agent, such the email server agent 1610, builds an email server snapshot, informs the email server of changes and stores the final mails server snapshot for use as a reference in a subsequent reconciliation. The local cache agent, such as calendar server agent 1611, builds a calendar database server snapshot and informs the calendar server of changes. The reconciliation engine, performed by reconciliation engine 1614, compares the snapshot differences and determines actions to be taken by the message server agent and local cache agent, and informs each agent of the necessary changes.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine readable medium containing executable program instructions which cause a data processing system to perform a method comprising:
    modifying or creating, by the data processing system, a record in a database maintained locally by the data processing system;
    encoding, by the data processing system, the database record into metadata; and
    sending, by the data processing system, the metadata as a first type of email message to a remote email message server, the first type of email message subsequently processed by a remote client application executing on a remote platform, the remote client application providing live controls that process the metadata to update a remote database on the remote platform without displaying any of metadata to a user as an email message, wherein the remote database is synchronized with a message server database based at least in part on two snapshot differences and resolving a conflict between the remote database and the message server database when the two snapshot differences indicate a conflict, a first snapshot difference abased on a difference of a current snapshot of the message server database with a reference snapshot of the message server database, and a second snapshot difference based on a difference of a current snapshot of the remote database with the reference snapshot of the message server database.

2. The non-transitory machine readable medium of claim 1, wherein the metadata is convertible into a remote database record by the remote client application to provide a synchronized view of the database record as modified by the data processing system.

3. The non-transitory machine readable medium of claim 1, wherein the encoding comprising generating the metadata to be displayable as a non-editable view of the database record as modified by the data processing system by a remote messaging client that does not provide live controls to process the first type of email message.

4. The non-transitory machine readable medium of claim 1, wherein the metadata is in MIME format, and the database record is a To do item.

5. A non-transitory machine readable medium containing executable program instructions which cause a data processing system to perform a method comprising:
    receiving, by the data processing system, a metadata file as a first type of email message from a remote email message server, the metadata file encoding a first database record stored in a message server database on the remote email message server;
    converting, by the data processing system, the metadata file to a second database record with a client application executing locally on the data processing system to update a local database on the data processing system, the second database record corresponding to the first database record, the client application providing live controls to convert the metadata file without displaying any of the metadata file to a user as an email message;
    presenting, by the data processing system, a view of the second database record through the client application;
    reconciling the local database and the message server database based at least in part on two snapshot differences, wherein a first snapshot difference created by comparing a current snapshot of the message server database with a reference snapshot of the message server database, and a second snapshot difference created by comparing a current snapshot of the local database with the reference snapshot of the message server database; and
    resolving a conflict between the local database and the message server database when the two snapshot differences indicate a conflict.

6. The non-transitory machine readable medium of claim 5, wherein the view of the second database record is editable through the client application.

7. The non-transitory machine readable medium of claim 5, wherein the local database is a local cache of the message server database.

8. The non-transitory machine readable medium of claim 5, wherein a snapshot comprises a list of paired database record identifiers and each pair includes both a universally unique database record ID and a message ID for a database record stored on the message server.

9. The non-transitory machine readable medium of claim 8, wherein reconciling further comprises:
    determining the message server database is to be modified with a third database record based on the first snapshot difference being indicative of no difference and the second snapshot difference being indicative of a difference; and
    sending metadata in a first type of email message to the remote email message server, the metadata encoding the third database record.

10. A machine implemented method comprising:
    modifying or creating, by a data processing system, a record in a database local to the data processing system;

encoding, by the data processing system, the modified database record into metadata; and sending, by the data processing system, the metadata as a first type of email message to a remote email message server, the first type of email message subsequently processed by a remote client application executing on a remote platform, the remote client application providing live controls that process the metadata to update a remote database on the remote platform without displaying any of the metadata to a user as an email message, wherein the remote database is synchronized with a message server database based at least in part on two snapshot differences and resolving a conflict between the remote database and the message server database when the two snapshot differences indicate a conflict, a first snapshot difference created by comparing a current snapshot of the message server database with a reference snapshot of the message server database, and a second snapshot difference created by comparing a current snapshot of the remote database with the reference snapshot of the message server database.

11. The machine implemented method of claim 10, wherein the metadata is in MIME format and the database record is a To do item.

12. A machine implemented method comprising:

receiving, by a data processing system, a metadata file as a first type of email message from a remote email message server, the metadata file encoding a first database record stored in a message server database on the remote email message server;

converting, by the data processing system, the metadata file to a second database record with a client application executing locally on the on the data processing system to update a local database on the data processing system, the second database record corresponding to the first database record, the client application providing live controls to convert the metadata file without displaying any of the metadata file to a user as an email message;

presenting, by the data processing system, a view of the database record through the client application; and reconciling the local database and the message server database based at least in part on two snapshot differences, a first snapshot difference created by comparing a current snapshot of the message server database with a reference snapshot of the message server database, and a second snapshot difference created by comparing a current snapshot of the local database with the reference snapshot of the message server database; and resolving a conflict between the local database and the message server database when the two snapshot differences indicate a conflict.

13. The machine implemented method of claim 12, wherein the view of the second database record is editable through the client application.

14. The machine implemented method of claim 12, wherein a snapshot is a list of paired database record identifiers and each pair includes both a universally unique database record ID and a message ID for a database record stored on the message server.

15. The machine implemented method of claim 14, wherein the reconciling further comprising:

determining the message server database is to be modified with a third database record based on the first snapshot difference being indicative of no difference and the second snapshot difference being indicative of a difference; and sending metadata, in a first type of email message, to the remote email message server, the metadata encoding the third database record.

* * * * *

UNITED STATES PATENT AND TRADEMARK OFFICE
CERTIFICATE OF CORRECTION

PATENT NO. : 10,068,203 B2
APPLICATION NO. : 13/278016
DATED : September 4, 2018
INVENTOR(S) : Brendan Langoulant et al.

Page 1 of 1

It is certified that error appears in the above-identified patent and that said Letters Patent is hereby corrected as shown below:

In the Claims

Column 25
Line 53, insert --the-- after "of".

Signed and Sealed this
Twenty-seventh Day of November, 2018

Andrei Iancu
*Director of the United States Patent and Trademark Office*